United States Patent
McColloch et al.

(10) Patent No.: US 9,810,873 B2
(45) Date of Patent: Nov. 7, 2017

(54) METHOD AND DEVICE FOR MEASURING ALIGNMENT OF AN OPTICAL SURFACE OF A LENS BLOCK

(71) Applicant: Avago Technologies General IP (Singapore) Pte. Ltd., Singapore (SG)

(72) Inventors: Laurence R. McColloch, Santa Clara, CA (US); Omid Momtahan, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 54 days.

(21) Appl. No.: 14/695,315

(22) Filed: Apr. 24, 2015

(65) Prior Publication Data

US 2016/0316191 A1    Oct. 27, 2016

(51) Int. Cl.
    *G02B 7/00* (2006.01)
    *G02B 6/42* (2006.01)

(52) U.S. Cl.
    CPC .............. *G02B 7/003* (2013.01); *G02B 6/42* (2013.01)

(58) Field of Classification Search
    CPC ...... G02B 6/4292; G02B 6/4204; G02B 6/93; H01L 2924/00; H01L 2224/48091
    See application file for complete search history.

(56) References Cited

U.S. PATENT DOCUMENTS

| | | | |
|---|---|---|---|
| 6,893,170 B1 * | 5/2005 | Edwards | G02B 6/4204 385/88 |
| 7,800,758 B1 * | 9/2010 | Bridges | G01B 11/002 356/482 |
| 8,315,492 B2 | 11/2012 | Chen et al. | |
| 2012/0114289 A1 | 5/2012 | DeMeritt et al. | |

* cited by examiner

*Primary Examiner* — Jennifer Doan

(57) ABSTRACT

An alignment feature formed in a lens block during manufacturing has a precise spatial relationship to an optical surface of the lens block such that precise alignment of the alignment feature within the lens block ensures precise alignment of the optical surface within the lens block. Precise alignment of the alignment feature within the lens block is readily assessable whereas precise alignment of the optical surface within the lens block is not. A determination is made as to whether the optical surface is aligned within the lens block by determining whether the alignment feature is aligned within the lens block, and if not, the extent of any misalignment. The extent of misalignment may then be used to adjust the manufacturing process to eliminate the alignment error.

22 Claims, 19 Drawing Sheets

METHOD AND DEVICE FOR MEASURING ALIGNMENT OF AN OPTICAL SURFACE OF A LENS BLOCK

FIELD OF THE INVENTION

The invention is directed to optical communications modules, and more particularly, to optics devices used in optical communications modules.

BACKGROUND

A variety of optical communications modules exist for transmitting and/or receiving optical data signals over optical waveguides, which are typically optical fibers. Optical communications modules include optical receiver modules, optical transmitter modules and optical transceiver modules. Optical receiver modules have one or more receive channels for receiving one or more optical data signals over one or more respective optical fibers. Optical transmitter modules have one or more transmit channels for transmitting one or more optical data signals over one or more respective optical fibers. Optical transceiver modules have one or more transmit channels and one or more receive channels for transmitting and receiving respective optical transmit and receive data signals over respective transmit and receive optical fibers. Bi-directional optical transceiver modules are configured to both transmit and receive optical data signals that are at different wavelengths over each optical fiber. In a bi-directional optical transceiver module, wavelength division multiplexing and demultiplexing techniques are used to multiplex and demultiplex the transmit and receive optical data signals, respectively.

For each of these different types of optical communications modules, a variety of designs and configurations exist. A typical layout of an optical communications module includes a module circuit board, such as a printed circuit board (PCB), a connector, such as an edge connector or a ball grid array (BGA), or the like, and various electrical components, optical components, and optoelectronic components mounted on the module circuit board. In the case of a typical optical transmitter module, one or more light sources such as laser diodes or light-emitting diodes (LEDs) and one or more driver integrated circuits (ICs) are mounted on the module circuit board and electrically interconnected with it. In the case of a typical optical receiver module, the module circuit board has one or more light detectors and a receiver IC mounted on it. Optical transceiver modules typically have one or more light sources, one or more light detectors, a light source driver IC, and receiver IC mounted on the module circuit board.

A typical optical communications module includes a lens block, sometimes referred to as an optical subassembly (OSA), that couples light between the light source or light detector and the end of the optical fiber. The end of the optical fiber is typically held in an optical connector module that mates with a receptacle of the optical communications module. The lens block is precisely located and oriented inside of the housing of the optical communications module and has one or more optical elements (e.g., lenses, reflectors, etc.) that are precisely aligned along the optical pathway(s) of the lens block for operating on the optical signals being coupled by the lens block between the light detector or light source and the end of the optical fiber. The optical elements of the lens block perform various operations including, for example, folding the optical pathway(s), collimating the light beams and focusing the light beams.

Features such as fiducials on the optical communications module housing or on other components of the optical communications module are often used to aid in the mounting of the lens block at a predesignated, aligned position inside of, or on the module housing. Passive and active alignment processes are often used to ensure that the lens block is mounted in its predesignated, aligned position. While such processes are capable of achieving precise positioning and alignment of the lens block relative to other components that are external to the lens block, they often cannot be used to align the optical elements within the lens block. The alignment of optical elements within the lens block is typically the responsibility of the lens block manufacturer. The lens blocks are often made of a molded plastic material. The lens block manufacturer typically checks the alignment of the optical elements by verifying that the mold is properly configured and by verifying that sample lens blocks made using the mold are satisfactory.

However, when the optical elements of the lens block become complicated, or complex, verifying proper alignment of the optical elements within the lens block is difficult. For example, if the lens block includes biconic lens surfaces or even more complicated lens surfaces, verifying proper alignment of the lens surfaces within the lens block is extremely difficult. In most cases, there is no direct way of verifying or measuring alignment. In such cases, the manufacturer often relies on functional optical testing to assess the alignment of the complicated lens surfaces. Functional optical testing judges the optical elements by how well the lens block as a whole performs.

One problem with functional optical testing is that the lens block manufacturers are usually precision mechanical experts, but have no or limited expertise in optics. Therefore, it is unlikely that the manufacturer will have access to or be trained to properly use a functional optical measurement system. Another problem with functional optical testing is that the functional optical measurements are often affected by properties and dimensions of surfaces or elements other than the optical surface or element in question. Consequently, it is very difficult to measure or verify proper alignment of individual optical surfaces of the lens block. Relying only on the functional optical measurement of the entire lens block usually results in the lens block having nominal performance that is not as good as the lens block design and much narrower tolerance windows than those of the lens block design. For these reasons, the inability to measure and correct each optical surface of the lens block is a limiting factor in making most complex lens blocks today.

Accordingly, a need exists for a way to measure alignment of complex optical surfaces of a lens block. A need also exists for a way to determine a correction that needs to be made to the manufacturing process to correct a misaligned complex optical surface of a lens blocks.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Illustrative embodiments described herein are directed to an alignment feature formed in the lens block during manufacturing that has a precise spatial relationship to a complex optical surface of the lens block such that precise alignment of the alignment feature within the lens block ensures precise alignment of the optical surface within the lens block. Precise alignment of the alignment feature within the lens block is readily assessable whereas precise alignment of the complex optical surface within the lens block is not. A determination is made as to whether the complex optical surface is aligned within the lens block by determining whether the alignment feature is aligned within the lens block. A determination as to the extent of any misalignment of the complex optical surface within the lens block can be made based on the extent of any misalignment of the alignment feature within the lens block. The extent of misalignment may then be used to adjust the manufacturing process to eliminate the alignment error associated with the complex optical surface. This ensures that performance of the manufactured lens blocks meets that of the lens block design and that the tolerance windows of the manufactured lens block are as large as those of the lens block design. Thus, the invention improves performance and manufacturing yield.

Prior to describing illustrative, or exemplary, embodiments of the method and device that are used to achieve these goals, an example of a lens block having a complex optical surface for which alignment within the lens block can be determined using the invention will be described with reference to FIGS. 1-13. Illustrative embodiments of the invention will then be described with reference to FIGS. 14-20. It should be noted that the invention is not limited to being used in connection with the illustrative, or exemplary, lens block described herein with reference to FIGS. 1-13.

Figure 1:
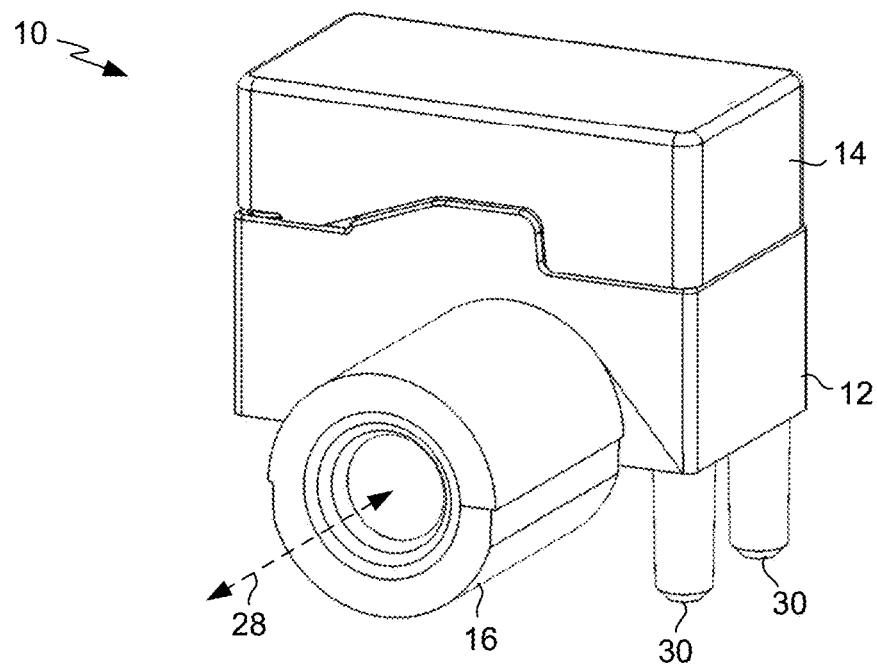
FIG. 1 is a front perspective view of an optics device, in accordance with an exemplary embodiment of the invention.
Figure 2:
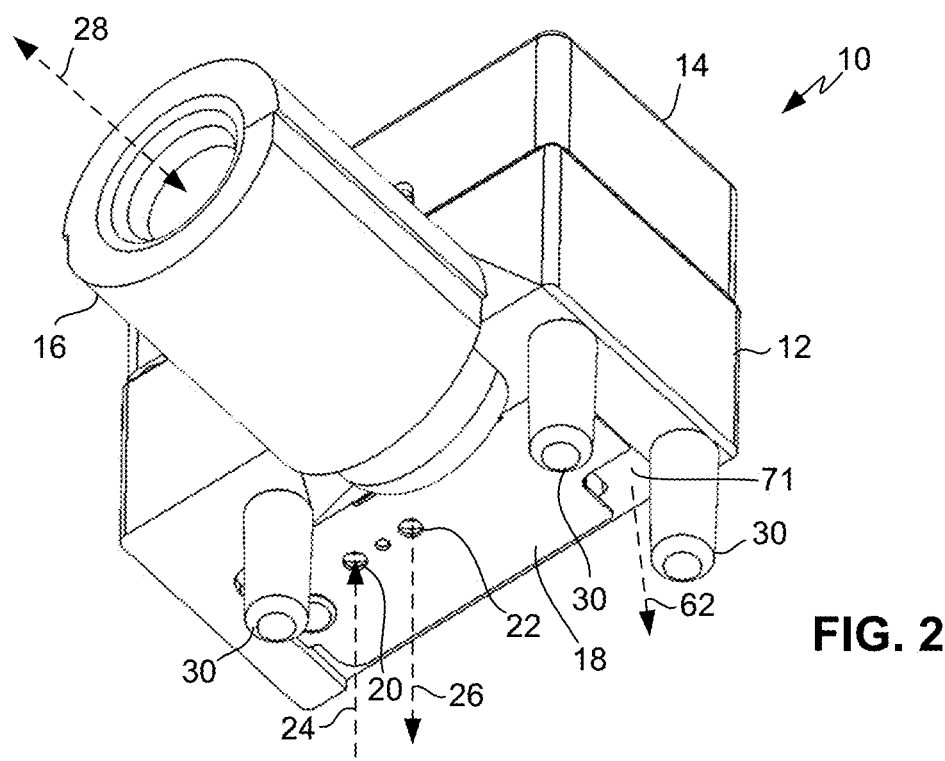
FIG. 2 is a bottom perspective view of the optics device.
Figure 3:
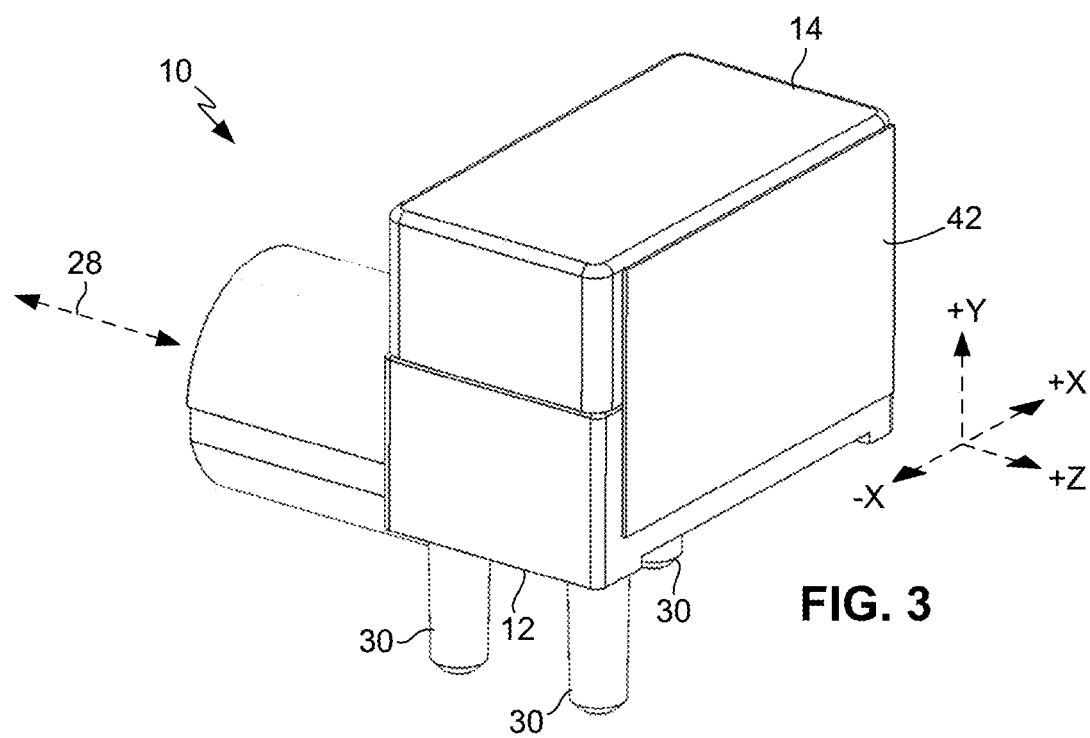
FIG. 3 is a rear perspective view of the optics device.

As illustrated in FIGS. 1-3, in an illustrative or exemplary embodiment of the invention, an optics device 10 for use in an optical communications module includes a lens block 12 attached to a lid 14. Lens block 12 has a generally cylindrical barrel 16. Lens block 12 can consist of molded optical-grade plastic that is transparent to both a transmit wavelength and a receive wavelength. Examples of suitable plastics include most optical grade plastics, such as polycarbonate, acrylic, polyetherimide, or olefin.

A baffle 18 (FIG. 2) is attached to the bottom of lens block 12. Baffle 18 can be a thin sheet of metal having apertures 20 and 22. When optics device 10 is in operation in the manner described below, optical beams are communicated along a first beam path axis 24 and a second beam path axis 26 aligned with apertures 20 and 22, respectively. During such operation, optical signals can be communicated along a barrel optical axis 28. Posts 30 that extend from the lower portion of lens block 12 can facilitate mounting optics device 10 in the manner described below.

Figure 4:
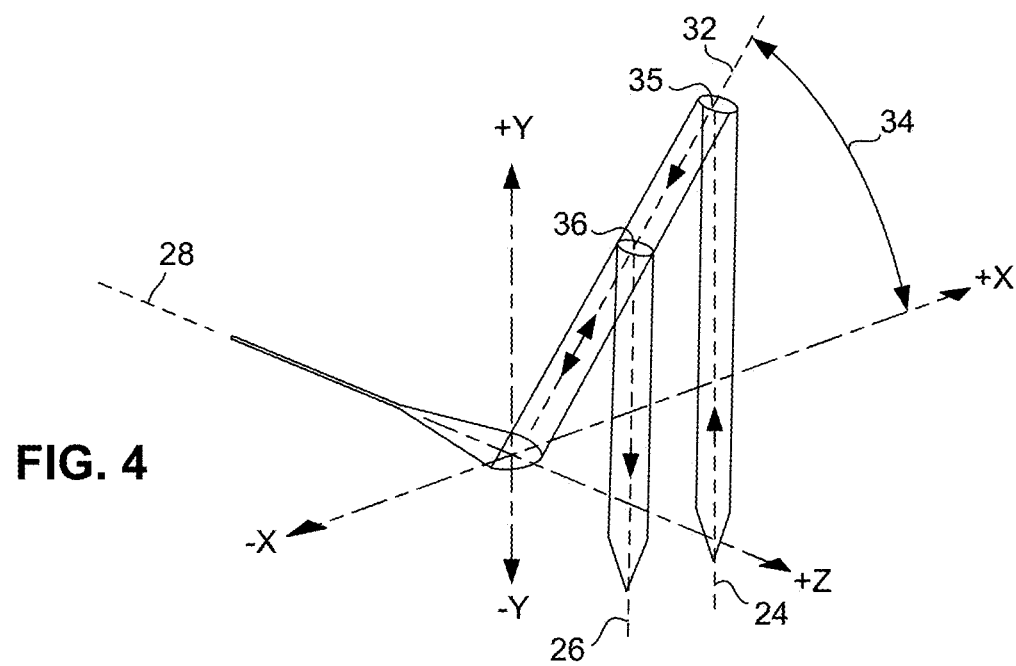
FIG. 4 is a diagram illustrating relative orientations of optical beam path axes of the optics device.
Figure 5:
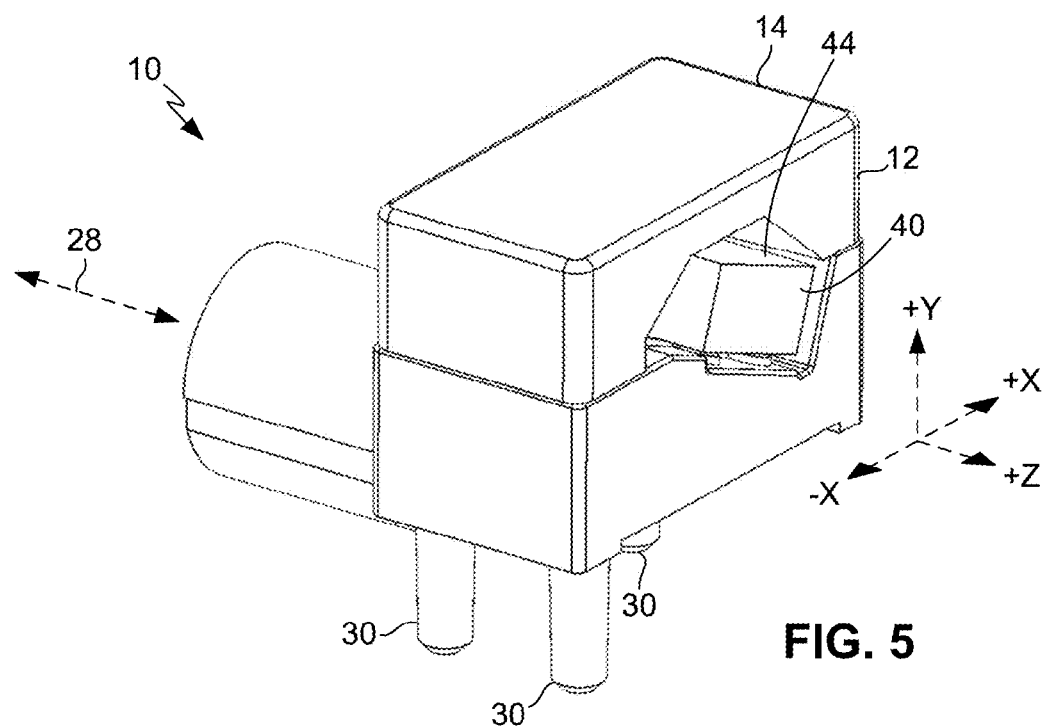
FIG. 5 is similar to FIG. 3, but with a rear cover removed to reveal the interior of the optics device.
Figure 6:
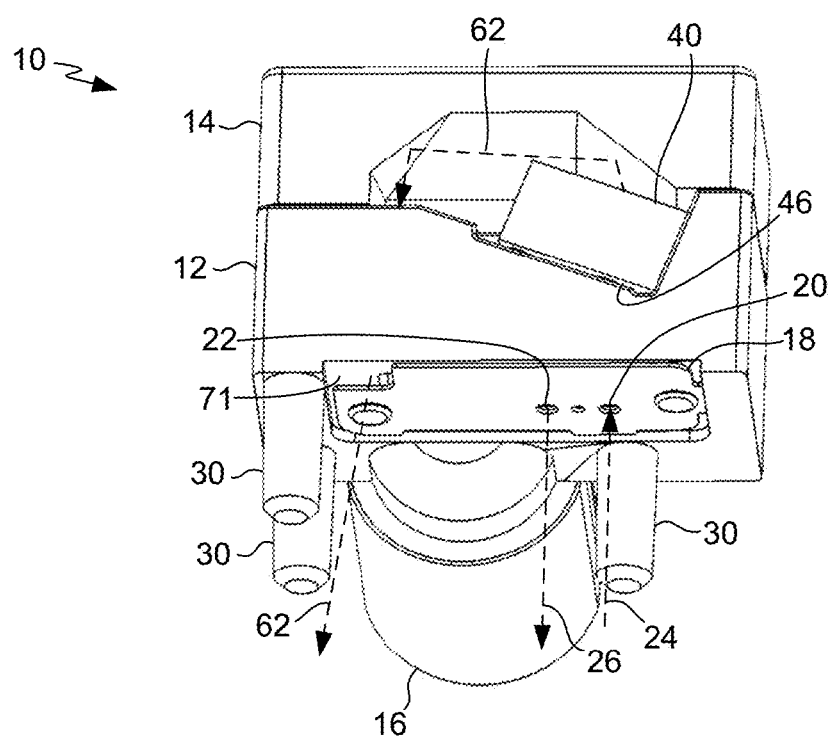
FIG. 6 is a bottom perspective view of the optics device, with the rear cover removed to reveal the interior.

As illustrated in FIG. 4, relationships among optical elements of optics device 10 and the operation of optics device 10 can be described with reference to an exemplary three-dimensional Cartesian coordinate system or frame of reference having X, Y and Z coordinates or dimensions. That is, the frame of reference has X, Y and Z axes that are mutually perpendicular to one another. The Z axis is aligned with the above-described barrel optical axis 28. A common beam path axis 32 is oriented in a direction having an X-axis component offset by a non-zero amount from barrel optical axis 28 and a Y-axis component offset by a non-zero amount from barrel optical axis 28. That is, in this exemplary reference system points on common beam path axis 32 have positive X and Y coordinates. Stated yet another way, common beam path axis 32 is rotated about the Z axis at a non-zero angle 34 with respect to the X axis. Angle 34 can be between zero and 90 degrees and, in the exemplary embodiment, is approximately 45 degrees.

It can also be noted that in the exemplary embodiment the intersection of common beam path axis 32 and barrel optical axis 28 is at coordinates {0,0,0} and that common beam path axis 32 lies in the X-Y plane. First beam path axis 24 intersects common beam path axis 32 at an intersection 35. Similarly, second beam path axis 26 intersects common beam path axis 32 at another intersection 36. In the exemplary embodiment first beam path axis 24 and second beam path axis 26 are parallel to each other and lie in the X-Y plane. It should be understood that for purposes of clarity the foregoing descriptions omit consideration of beam width of optical beams. One of ordinary skill in the art can appreciate that optical beams are subject to spreading and other effects, as conceptually indicated in solid line around portions of axes 24, 26, 28, 32.

As illustrated in FIGS. 5-8, a filter block 40 is disposed in a cavity inside optics device 10. A cover 42 (FIG. 3), which can be a film or sheet of thin plastic adhered to the rear wall of optics device 10, seals the cavity and protects optical elements within the cavity against contamination by foreign matter, such as dust and moisture, which could adversely affect the optical qualities of such elements.

In an exemplary embodiment, filter block 40 is block-shaped, i.e., six-sided and rectangular, and made of glass. An upper surface 44 (FIG. 5) of filter block 40 is mirrored, such as by silver, dielectric, or other mirror coating that provides an at least partially reflective interface at a first wavelength (though the reflectivity need not be wavelength-dependent). The reflective interface defined by upper surface 44 can have a selected amount of reflectivity at the first wavelength. A lower surface 46 (FIG. 6) of filter block 40 similarly has a coating that provides a reflective interface at a second wavelength. The reflective interface defined by lower surface 46 is substantially reflective at the second wavelength. As used herein, the term "substantially" means greater than about 80 percent. Lower surface 46 is also substantially transmissive at the first wavelength. Lower surface 46 thus serves as a bandpass or notch filter that passes the first wavelength and reflects the second wavelength.

Lower surface 46 directly contacts three landings or pads 45 (FIG. 8) on an upper portion of lens block 12 to provide a kinematic mount for filter block 40. Optically transparent epoxy 47 (FIG. 8) in the spaces between lower surface 46 and the adjacent surfaces of lens block 12 adheres filter block 40 to lens block 12.

Figure 7:
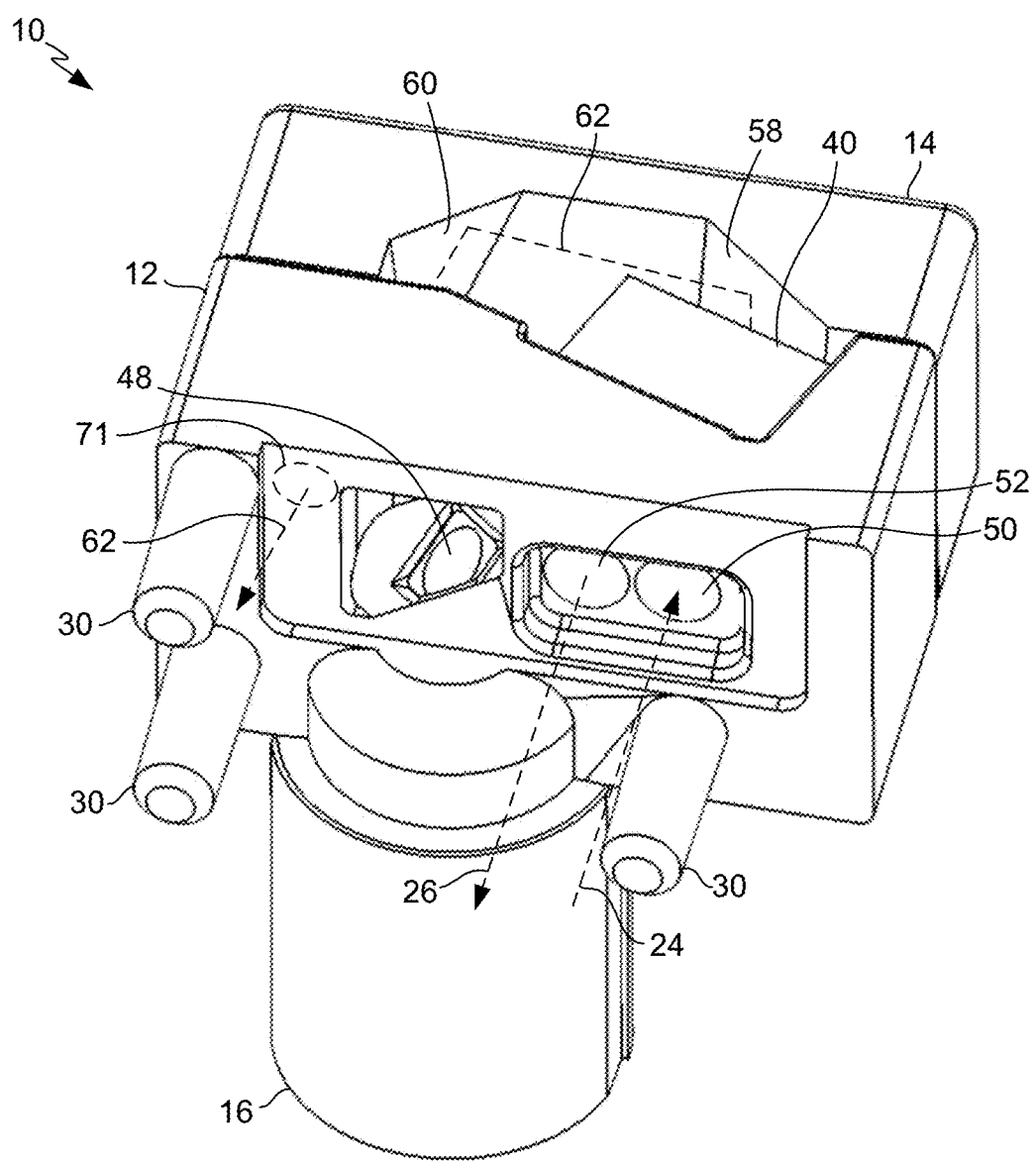
FIG. 7 is similar to FIG. 6, but with a bottom baffle removed to reveal the lenses of the optics device.

As illustrated in FIG. 7, the lower portion of lens block 12 includes a total internal reflection (TIR) lens 48 that is configured to provide the above-described beam rotation as well as a collimating effect. Note that TIR lens 48 does not rely upon an air gap for its optical effect. Rather, TIR lens 48 is part of the same continuous, homogeneous region of optically transparent material of which the remainder of lens block 12 consists. Such a region of material may be referred to herein for convenience as a "solid block" of the material. To provide the rotating and collimating effects described herein, TIR lens 48 has an irregular shape, which is a biconic shape in this illustrative embodiment. Thus, the TIR lens 48 is a complex optical surface. For reasons that are described below in more detail, due to its complexity, alignment of the TIR lens 48 within the lens block 12 is difficult or impossible to measure directly. The manner in which the method and device of the invention are used to determine whether the TIR lens 48 is in a precisely-aligned position within the lens block 12 are described below with reference to FIGS. 14-20.

The lower portion of lens block 12 also includes a first lens 50 and a second lens 52, both of which are configured to provide a focusing effect. First and second lenses 50 and 52 can each have a convex shape. As lens block 12 consists of a solid block of material in the exemplary embodiment, lenses 48, 50 and 52 are co-formed in the solid block of material along with all other features of lens block 12. Thus, lenses 48, 50 and 52 are defined by convex regions of a surface of lens block 12. Lenses 48, 50 and 52 are slightly recessed in lens block 12 below the surface to which baffle 18 (FIG. 6) is attached.

First and second lenses 50 and 52 are respectively aligned along first and second beam path axes 24 and 26, described above with regard to FIG. 4. Although not shown in FIG. 7, it can be appreciated that intersection 35 (FIG. 4), at which first beam path axis 24 intersects common beam path axis 32, is located on upper surface 44 (FIG. 5) of filter block 40, and intersection 36 (FIG. 4), at which second beam path axis 26 intersects common beam path axis 32, is located on lower surface 46 (FIG. 6) of filter block 40. Note that the portion of first beam path axis 24 between first lens 50 and the cavity in which filter block 40 is mounted consists of the material of lens block 12 that is transparent to the transmit and receive wavelengths. Similarly, the portion of second beam path axis 26 between second lens 52 and the cavity in which filter block 40 is mounted consists of the material of lens block 12 that is transparent to the transmit and receive wavelengths. Thus, although not shown in FIG. 7, it can be appreciated that common beam path axis 32 (FIG. 4) intersects upper surface 44 of filter block 40, lower surface 46 of filter block 40, and TIR lens 48.

Figure 8:
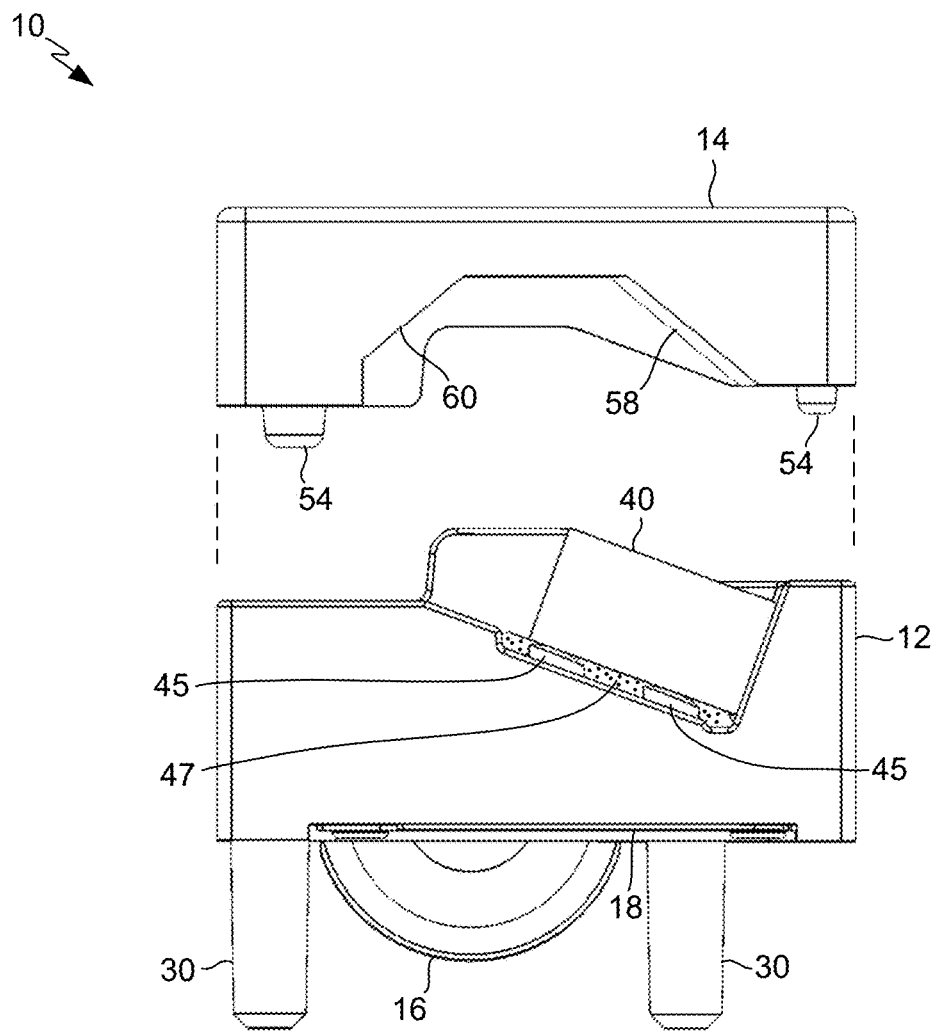
FIG. 8 is rear elevation view of the optics device, with the lid and body disassembled from each other.
Figure 9:
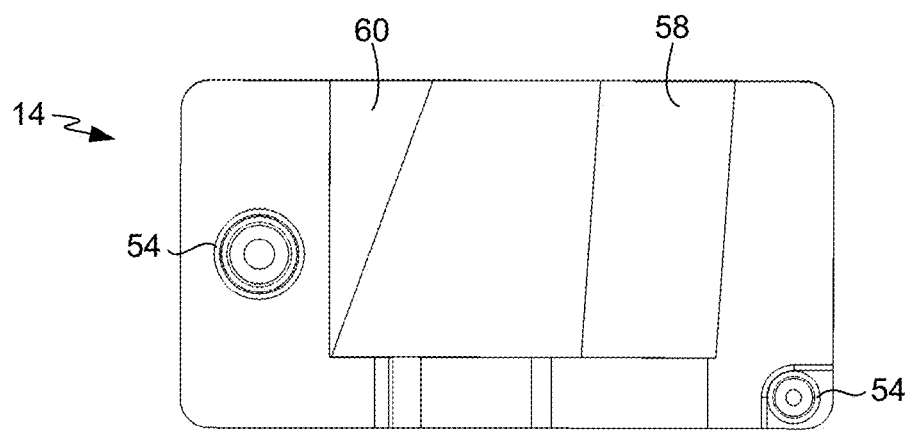
FIG. 9 is a bottom plan view of the lid of FIG. 8.
Figure 10:
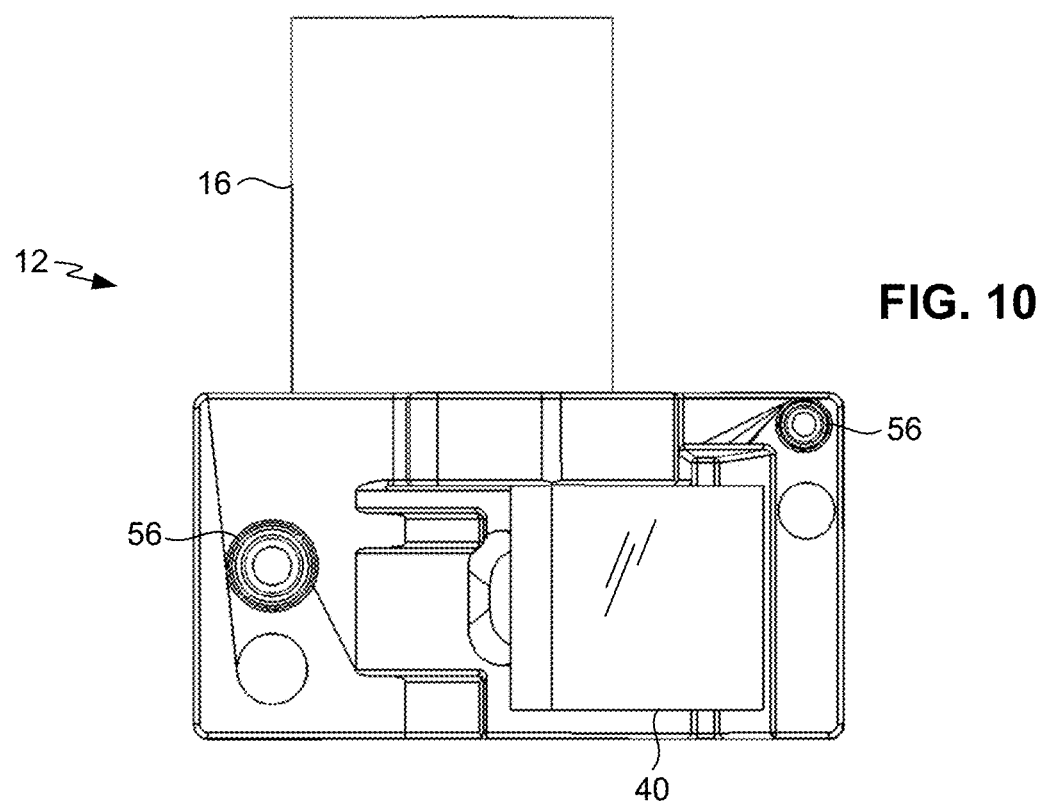
FIG. 10 is a top plan view of the body of FIG. 8.

As illustrated in FIGS. 8-10, a pair of posts 54 (FIGS. 8 and 9) on a lower portion of lid 14 are received in a pair of correspondingly located bores 56 (FIG. 10) in an upper portion of lens block 12 to attach lid 14 to lens block 12. The lower portion of lid 14 includes a recessed region having a first reflective surface 58 and a second reflective surface 60. As described in further detail below with regard to embodiments shown in FIGS. 11A and 11B, a portion of a feedback beam path 62 (FIG. 11A) extends between first reflective surface 58 and second reflective surface 60. Lid 14 can be made economically entirely out of molded white plastic as a single piece (i.e., lid 14 can consist of molded white plastic), as the reflectivity of white plastic is generally sufficient for feedback purposes as described below.

Figure 11A:
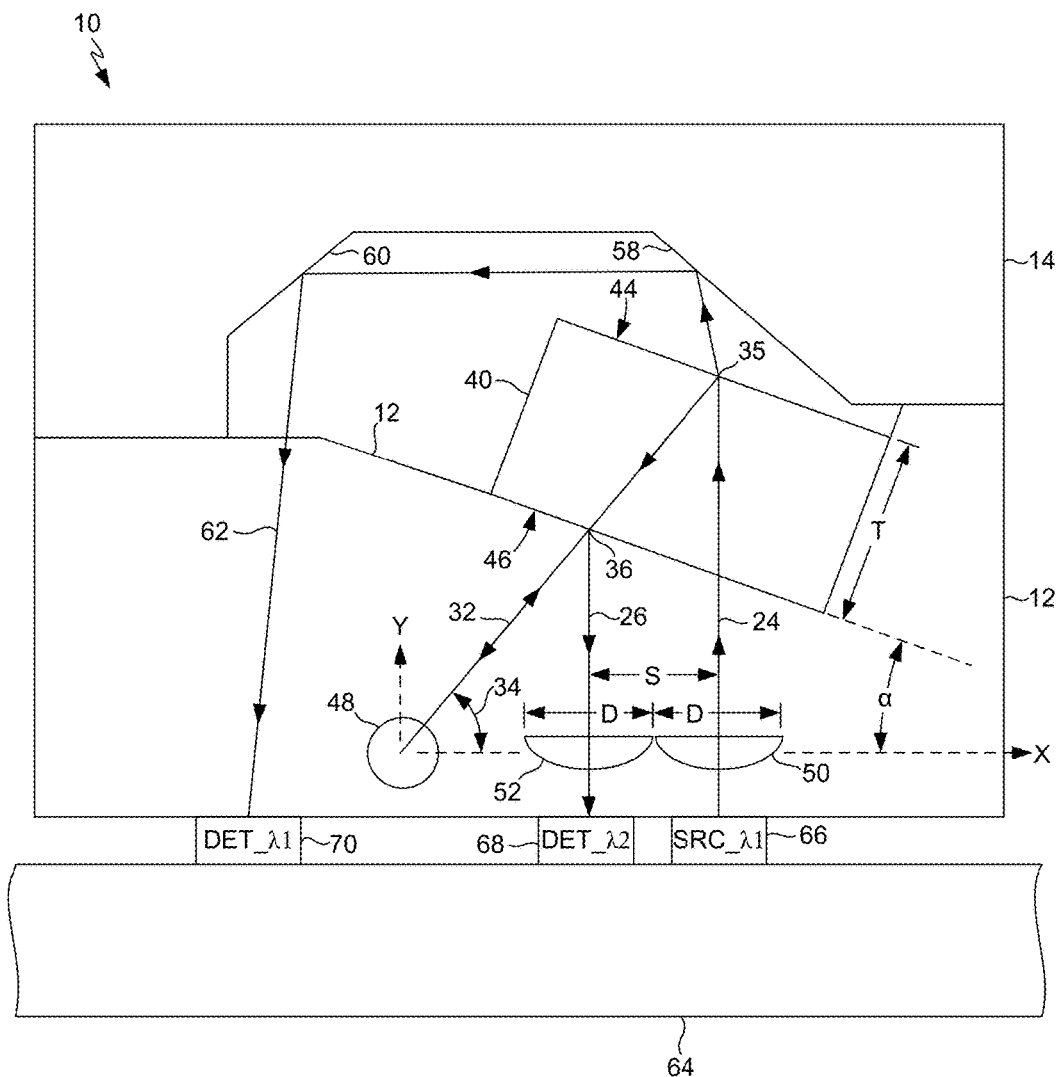
FIG. 11A is an optics diagram showing optical beam paths in relation to optical and opto-electronic elements of the optics device in an embodiment relating to a bidirectional transceiver module.
Figure 11B:
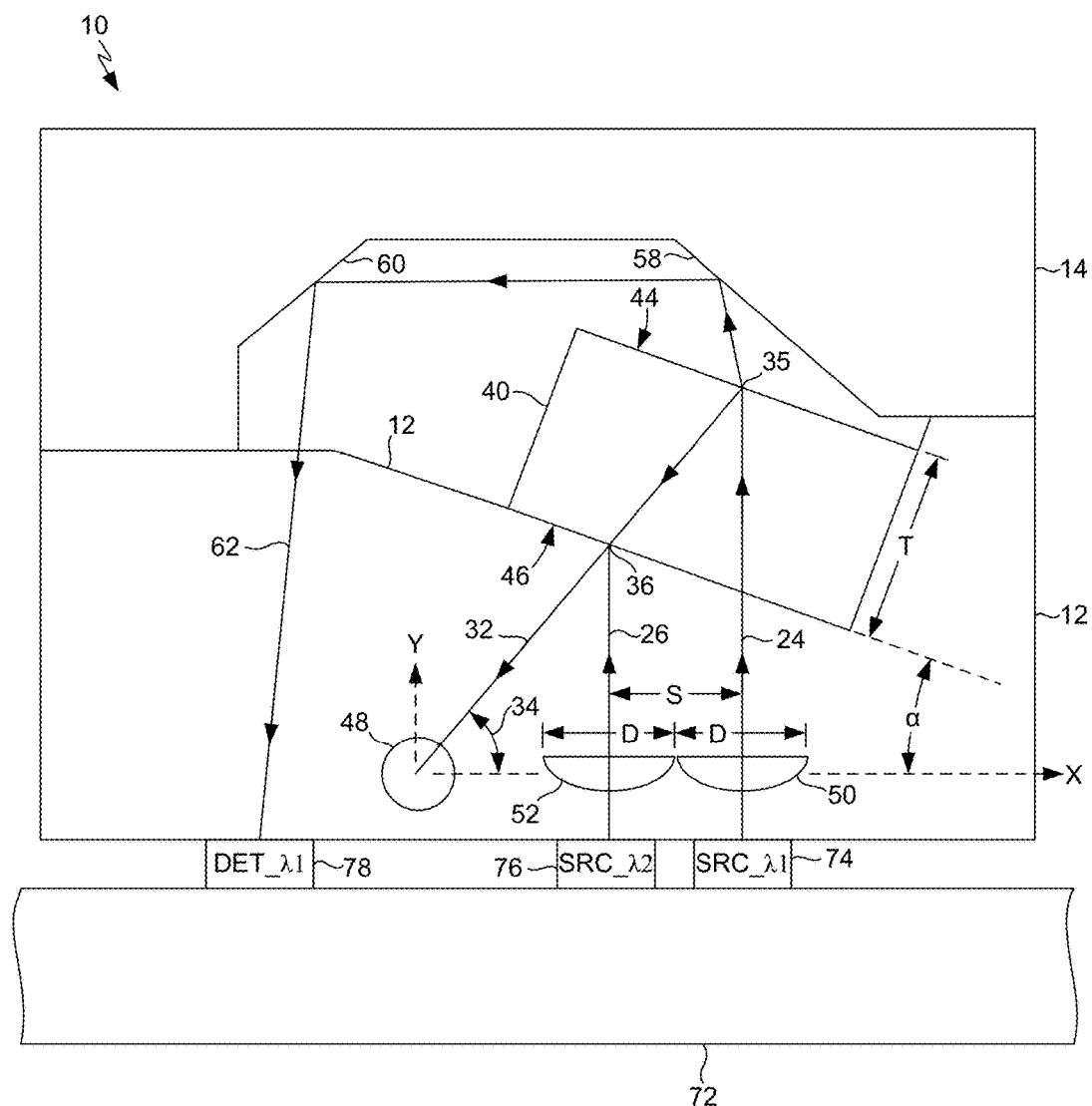
FIG. 11B is an optics diagram showing optical beam paths in relation to optical and opto-electronic elements of the optics device in an embodiment relating to a WDM transmitter module.
Figure 11C:
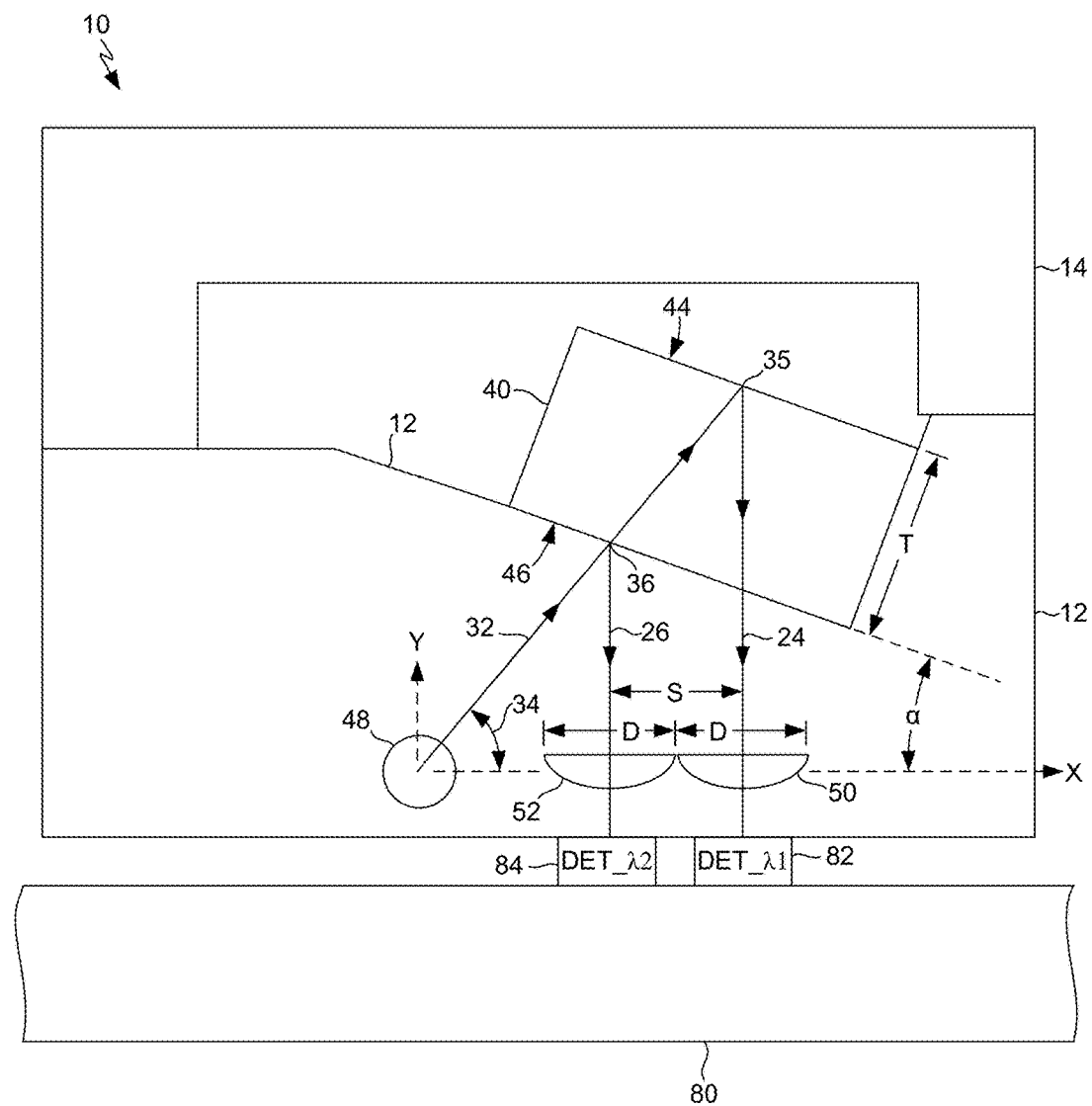
FIG. 11C is an optics diagram showing optical beam paths in relation to optical and opto-electronic elements of the optics device in an embodiment relating to a WDM receiver module.

As illustrated in FIG. 11A, in this exemplary embodiment optics device 10 is mounted on a substrate 64. Substrate 64 can be of any suitable type, such as a molded leadframe or a printed circuit board (PCB). As FIGS. 11A-11C are intended to provide diagrammatic views for purposes of describing the operation of these embodiments, details of the structure are not shown for purposes of clarity.

In the exemplary embodiment illustrated in FIG. 11A, a light source 66, such as a laser, is mounted on the surface of substrate 64 adjacent to first lens 50 and in optical alignment with first beam path axis 24. Light source 66 is configured to emit optical signals of a first wavelength ($\lambda 1$) in response to electrical signals. A main light detector 68, such as PIN photodiode, is mounted on the surface of substrate 64 adjacent to second lens 52 and in optical alignment with second beam path axis 26. Main light detector 68 is configured to detect optical signals of a second wavelength ($\lambda 2$) and, in response, produce corresponding electrical signals. A feedback light detector 70 is similarly mounted on the surface of substrate 64 adjacent to a wall or surface of the lower portion of lens block 12. Feedback light detector 70 is configured to detect optical signals of the first wavelength (λ1) and, in response, produce corresponding electrical signals. In this embodiment, light source 66, main light detector 68, and feedback light detector 70 can all be mounted along a line parallel to the X axis. Note that first lens 50, second lens 52 and TIR lens 48 are similarly located along a line defined by the X axis.

It can also be noted that since filter block 40 has a thickness (T), the upper and lower surfaces 44 and 46 of filter block 40 are oriented at an angle (α) with respect to the X axis that is selected to provide a distance or separation (S) between first beam path axis 24 and second beam path axis 26. As first and second lenses 50 and 52 occupy some amount of space on the lower portion of lens block 12, the separation (S) is great enough to accommodate that space. For example, in an embodiment in which transmit and receive lenses 50 and 52 are immediately adjacent one another and have diameters (D), the thickness (T) and the angle (α) of filter block 40 with respect to the X axis can be selected to provide a separation (S) that is D or greater.

In operation, in the embodiment shown in FIG. 11A, an optical signal (i.e., light beam) of the second wavelength can be received through barrel 16 along barrel optical axis 28 (FIGS. 1-4). The TIR lens 48 reflects such a received (Rx) beam at the angle 34 onto common beam path axis 32. This reflected Rx beam propagates through the transparent material of lens block 12 and impinges upon lower surface 46 of filter block 40, which reflects the Rx beam onto second beam path axis 26 because in this embodiment lower surface 46 is substantially reflective at the second wavelength. The Rx beam propagates along second beam path axis 26 through the transparent material of lens block 12, including second lens 52, which focuses the Rx beam. The focused Rx beam impinges upon main light detector 68, which converts the optical signal into a corresponding electrical Rx signal. Main light detector 68 provides the electrical Rx signal to electrical signal conductors (not shown) associated with substrate 64.

Also, in operation, light source 66 can receive an electrical transmit (Tx) signal from other electrical signal conductors (not shown) associated with substrate 64 and convert the electrical Tx signal into a corresponding optical transmit signal (i.e., light beam) of the first wavelength. Light source 66 emits such an optical Tx beam along first beam path axis 24, through first lens 50, which collimates the Tx beam. The Tx beam continues to propagate along transmit beam path axis 24 through the transparent material of lens block 12 and impinges upon lower surface 46 of filter block 40. Lower surface 46 does not reflect the Tx beam because in this embodiment lower surface 46 is substantially transmissive at the transmit wavelength. Rather, the Tx beam passes into filter block 40 along first beam path axis 24 and impinges upon upper surface 44 of filter block 40. Upper surface 44 reflects a portion of the optical energy of the Tx beam onto common beam path axis 32 because in this embodiment upper surface 44 is partially reflective at the transmit wavelength. This reflected portion of the Tx beam impinges upon and is transmitted through lower surface 46. This portion of the Tx beam continues to propagate along common beam path axis 32 through the transparent material of lens block 12 and impinges upon TIR lens 48, which reflects it into barrel 16 along barrel optical axis 28 (FIGS. 1-4).

Because in this embodiment upper surface 44 of filter block 40 is only partially reflective at the transmit wavelength and not completely (100 percent) reflective, another portion of the optical energy (such as, for example, about 10 percent or less) of the Tx beam is transmitted through upper surface 44 and is used as a feedback beam in a feedback control loop for measuring transmit power. This feedback beam impinges upon first reflective surface 58, which reflects it along a portion of feedback beam path 62 toward second reflective surface 60. Second reflective surface 60 further reflects this feedback beam along another portion of feedback beam path 62 into the transparent material of lens block 12. The feedback beam propagates through this portion of lens block 12 and is emitted from lens block 12 at a feedback beam exit region 71 (FIGS. 2, 6 and 7) on a lower portion of lens block 12. As feedback light detector 70 is located adjacent feedback beam exit region 71 and is optically aligned along the corresponding portion of feedback beam path 62, the feedback beam impinges upon feedback light detector 70. Feedback light detector 70 converts this feedback optical signal into a feedback electrical signal and provides the feedback electrical signal to corresponding conductors (not shown) associated with substrate 64.

To adequately gauge the transmitted power, the feedback beam need be no greater than a small percentage of the Tx beam. Thus, the white plastic material of which lid 14 consists in this exemplary embodiment need not be completely (100 percent) reflective. Economical white plastic is commonly about 80-90 percent reflective. For these reasons, white plastic is a suitable material.

Note that TIR lens 48 is located between feedback beam exit region 71 and receive lens 52. Stated another way, feedback beam path 62 is generally "U"-shaped, such that feedback beam exit region 71 is located on the opposite end of the "U" from the end at which transmit and receive lenses 50 and 52 are located, and TIR lens 48 is located between the ends of the "U." This U-shaped arrangement helps economize space within optics device 10.

As illustrated in FIG. 11B, in another exemplary embodiment optics device 10 is mounted on a substrate 72 that can be similar to substrate 64 in the embodiment described above with regard to FIG. 11A. In this embodiment, a first light source 74, such as a laser, is mounted on the surface of substrate 72 adjacent to first lens 50 and in optical alignment with first beam path axis 24. First light source 74 is configured to emit optical signals of a first wavelength (λ1) in response to electrical signals. A second light source 76 is mounted on the surface of substrate 72 adjacent to second lens 52 and in optical alignment with second beam path axis 26. Second light source 76 is configured to emit optical signals of a second wavelength (λ2) in response to electrical signals. A feedback light detector 78 is similarly mounted on the surface of substrate 72 adjacent to a wall or surface of the lower portion of lens block 12. Feedback light detector 78 is configured to detect optical signals of the first wavelength (λ1) and, in response, produce corresponding electrical signals. In this embodiment, first light source 74, second light source 76, and feedback light detector 78 can all be mounted along a line parallel to the X axis.

In operation, in the embodiment shown in FIG. 11B, first light source 74 can receive a first electrical transmit (Tx_1) signal from other electrical signal conductors (not shown) associated with substrate 72 and convert the electrical Tx_1 signal into a corresponding optical transmit signal (i.e., light beam) of the first wavelength. First light source 74 emits such an optical Tx_1 beam along first beam path axis 24, through first lens 50, which focuses the Tx_1 beam. The Tx_1 beam continues to propagate along first beam path axis 24 through the transparent material of lens block 12 and impinges upon lower surface 46 of filter block 40. Lower surface 46 does not reflect the Tx_1 beam because in this embodiment lower surface 46 is substantially transmissive at the transmit wavelength. Rather, the Tx_1 beam passes into filter block 40 along first beam path axis 24 and impinges upon upper surface 44 of filter block 40. Upper surface 44 reflects a portion of the optical energy of the Tx_1 beam onto common beam path axis 32 because in this embodiment upper surface 44 is partially reflective at the transmit wavelength. This reflected portion of the Tx_1 beam impinges upon and is transmitted through lower surface 46. This portion of the Tx_1 beam continues to propagate along common beam path axis 32 through the transparent material of lens block 12 and impinges upon TIR lens 48, which reflects and focuses the beam into barrel 16 along barrel optical axis 28 (FIGS. 1-4).

As in the embodiment described above with regard to FIG. 11A, a portion of the optical energy of the Tx_1 beam is transmitted through upper surface 44 and is used as a feedback beam in a feedback control loop for measuring transmit power. As in the embodiment described above with regard to FIG. 11A, the feedback beam is reflected by first and second reflective surfaces 58 and 60 of lid 14. The feedback beam impinges upon feedback light detector 78, which converts the feedback optical signal into a feedback electrical signal and provides the feedback electrical signal to corresponding conductors (not shown) associated with substrate 72.

In addition, in this embodiment second light source 76 similarly can receive a second electrical transmit (Tx_2) signal from other electrical signal conductors (not shown) associated with substrate 72 and convert the electrical Tx_2 signal into a corresponding optical transmit signal (i.e., light beam) of the second wavelength. Second light source 76 emits such an optical Tx_2 beam along second beam path axis 26, through second lens 52, which focuses the Tx_2 beam. The Tx_2 beam continues to propagate along second beam path axis 26 through the transparent material of lens block 12 and impinges upon lower surface 46 of filter block 40. Lower surface 46 reflects the Tx_2 beam because in this embodiment lower surface 46 is substantially reflective at the second transmit wavelength. This reflected Tx_2 beam continues to propagate along common beam path axis 32 through the transparent material of lens block 12 and impinges upon TIR lens 48, which reflects it into barrel 16 along barrel optical axis 28 (FIGS. 1-4).

As illustrated in FIG. 11C, in still another exemplary embodiment optics device 10 is mounted on a substrate 80 that can be similar to substrates 64 and 72 in the embodiments described above with regard to FIGS. 11A and 11B. In this embodiment, a first light detector 82, such as PIN photodiode, is mounted on the surface of substrate 80 adjacent to first lens 50 and in optical alignment with first beam path axis 24. First light detector 82 is configured to detect optical signals of a first wavelength (λ1) and, in response, produce corresponding electrical signals. In addition, a second light detector 84, such as PIN photodiode, is mounted on the surface of substrate 80 adjacent to second lens 52 and in optical alignment with second beam path axis 26. Second light detector 84 is configured to detect optical signals of a second wavelength (λ2) and, in response, produce corresponding electrical signals.

In operation, in the embodiment shown in FIG. 11C, a first optical signal (i.e., light beam) of the first wavelength can be received through barrel 16 along barrel optical axis 28 (FIGS. 1-4). The TIR lens 48 reflects such a first receive (Rx_1) beam at the angle 34 onto common beam path axis 32. This reflected Rx_1 beam propagates through the transparent material of lens block 12 and passes through lower surface 46 of filter block 40 along common beam path axis 32 because in this embodiment lower surface 46 is substantially transmissive at the first wavelength. This Rx_1 beam propagates through filter block 40 along common beam path axis 32 and impinges upon upper surface 44 of filter block 40. Upper surface 44 reflects the optical energy of the Rx_1 beam onto first beam path axis 24 because in this embodiment upper surface 44 is substantially reflective at the first transmit wavelength. This reflected Rx_1 beam propagates back through filter block 40 along first beam path axis 24 and is transmitted through lower surface 46. The Rx_1 beam continues to propagate along first beam path axis 24 through the transparent material of lens block 12, including first lens 50, which focuses the Rx_1 beam. The focused Rx_1 beam impinges upon first light detector 82, which converts the optical signal into a corresponding electrical Rx_1 signal. First light detector 82 provides the electrical Rx_1 signal to electrical signal conductors (not shown) associated with substrate 80.

In addition, in this embodiment a second optical signal (i.e., light beam) of the second wavelength can be received through barrel 16 along barrel optical axis 28 (FIGS. 1-4). The TIR lens 48 reflects such a second receive (Rx_2) beam at the angle 34 onto common beam path axis 32. This reflected Rx_2 beam propagates through the transparent material of lens block 12 and impinges upon lower surface 46 of filter block 40, which reflects the Rx_2 beam onto second beam path axis 26 because lower surface 46 is substantially reflective at the second wavelength. The Rx_2 beam propagates along second beam path axis 26 through the transparent material of lens block 12, including second lens 52, which focuses the Rx_2 beam. The focused Rx_2 beam impinges upon second light detector 84, which converts the optical signal into a corresponding electrical Rx_2 signal. Second light detector 84 provides the electrical Rx_2 signal to electrical signal conductors (not shown) associated with substrate 80.

Figure 12:
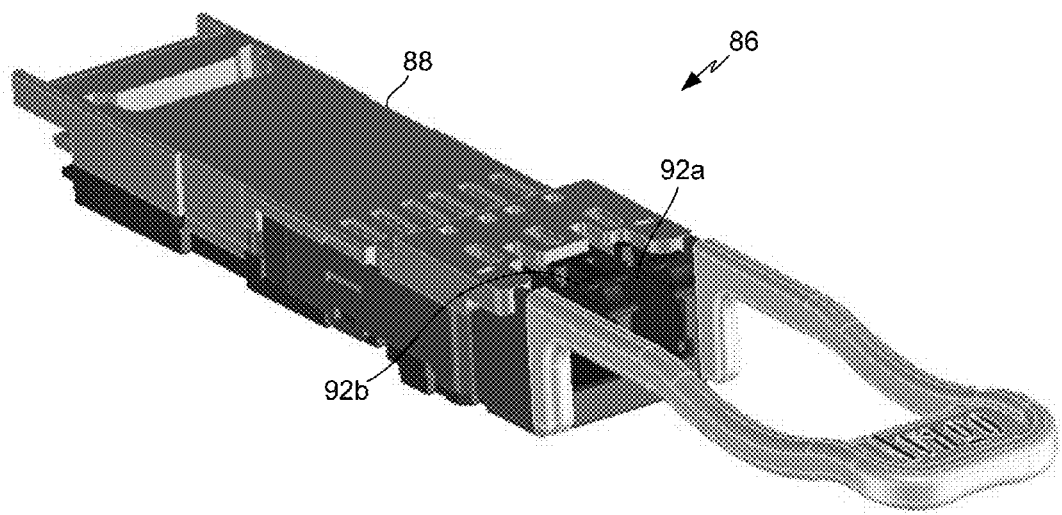
FIG. 12 is a perspective view of a bidirectional optical transceiver module that includes the optics device.
Figure 13:
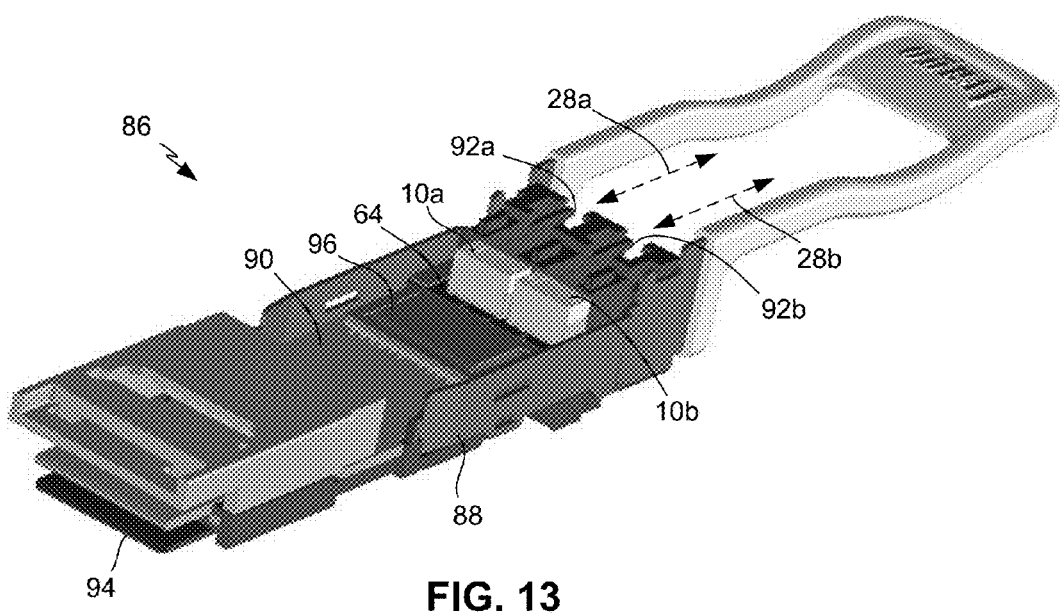
FIG. 13 is a perspective view of the bidirectional optical transceiver module of FIG. 12, with a portion of the module housing removed to show two of the optics devices mounted within the module housing.

As illustrated in FIGS. 12 and 13, in an exemplary embodiment an optical transceiver module 86 includes two of optics devices 10a and 10b, each of which can be identical to above-described optics device 10. Each of optics devices 10a and 10b is mounted at a forward end of a module housing 88 in the manner described above with regard to FIGS. 11A-11C. Features of the mounting arrangement described above with regard to FIGS. 11A-11C that are not shown in FIGS. 12 and 13 for purposes of clarity include the mounted opto-electronic devices (e.g., light source 66, main light detector 68, and feedback light detector 70). For example, substrate 64, on which light source 66, main light detector 68, and feedback light detector 70 are mounted as described above with regard to FIG. 11A can, in turn, be mounted on a PCB 90 in a conventional manner. The PCB 90 has an elongated shape and extends between the forward and rearward ends of module housing 88.

It can be noted that optical transceiver module 86 has a form that is generally characteristic of SFP, QSFP, CXP, CFP, etc., configurations: an elongated, rectangular housing shape; one or more optical receptacles 92a and 92b at the forward end that are configured to mate with an LC plug or similar optical connector (not shown); and one or more electrical contact pad arrays 94 at the rearward end that are configured to mate with a connector in an enclosure into which optical transceiver module 86 is plugged. Optics devices 10a and 10b have corresponding barrel optical axes 28a and 28b, each of which is the same as above-described barrel optical axis 28. Although not shown for purposes of clarity, when an LC plug or similar connector of an optical fiber cable is mated with one of receptacles 92a and 92b, the optical axis of the fiber end retained in the connector is aligned with the corresponding barrel optical axis 28*a* and 28*b*. Accordingly, during operation, the above-described Tx and Rx beams are communicated through such a fiber. (In some embodiments, a fiber stub (not shown) can be attached in a conventional manner to barrel 16 of lens block 12 as an intermediary element.) As the general structure and operation of conventional QSFP, SFP, CXP, CFP, etc., optical transceivers are well understood in the art, such conventional aspects of optical transceiver module 86 are not described herein for brevity. However, aspects of optical transceiver module 86 that are not conventional and thus should be noted include, for example, the compact size of optics devices 10*a* and 10*b* in relation to module housing 88 and their positions within module housing 88.

More specifically, the compact size of optics devices 10*a* and 10*b* helps economize space within a module housing 88 having a conventional size and shape as defined in the corresponding housing specification. Also, note that the region within module housing 88 just rearward of optics devices 10*a* and 10*b* is occupied by an integrated circuit chip 96 mounted on PCB 90. Such an integrated circuit chip 96 can include driver circuitry for generating the above-described electrical Tx signals, receiver circuitry for processing the above-described electrical Rx signals, and feedback circuitry for processing the above-described feedback electrical signals. The compact size of optics devices 10*a* and 10*b* helps maximize the area on substrate 64 that can be occupied by such circuitry. In addition, and significantly, the compact size of optics devices 10*a* and 10*b* enables such circuitry to be located in close proximity to the opto-electronic devices (e.g., above-described light source 66, main light detector 68, etc.) and thereby minimize the length of signal traces on PCB 90 that interconnect the circuitry and the opto-electronic devices. Minimizing the length of such interconnecting signal traces promotes signal integrity, which in turn promotes high bit rates.

The small size of optics device 10 helps significantly reduce attenuation loss because of the much shorter optical path length in plastic, often from reducing loss from 7 db to under 1 db loss, which is significant with a high speed laser producing much less light. The optical loss of conventional design is often not tolerable. The shorter optical path length in the above-described embodiments than in conventional designs greatly improves tolerances, and the angles of the surfaces are much less critical than in longer conventional designs resulting in a large yield improvement.

Several structural features promote the compact size of optics device 10, including, for example, that optics device 10 includes no more than a single filter block 40 or other such wavelength-selective element, and the above-described geometric relationships among the optical elements.

Figure 14:
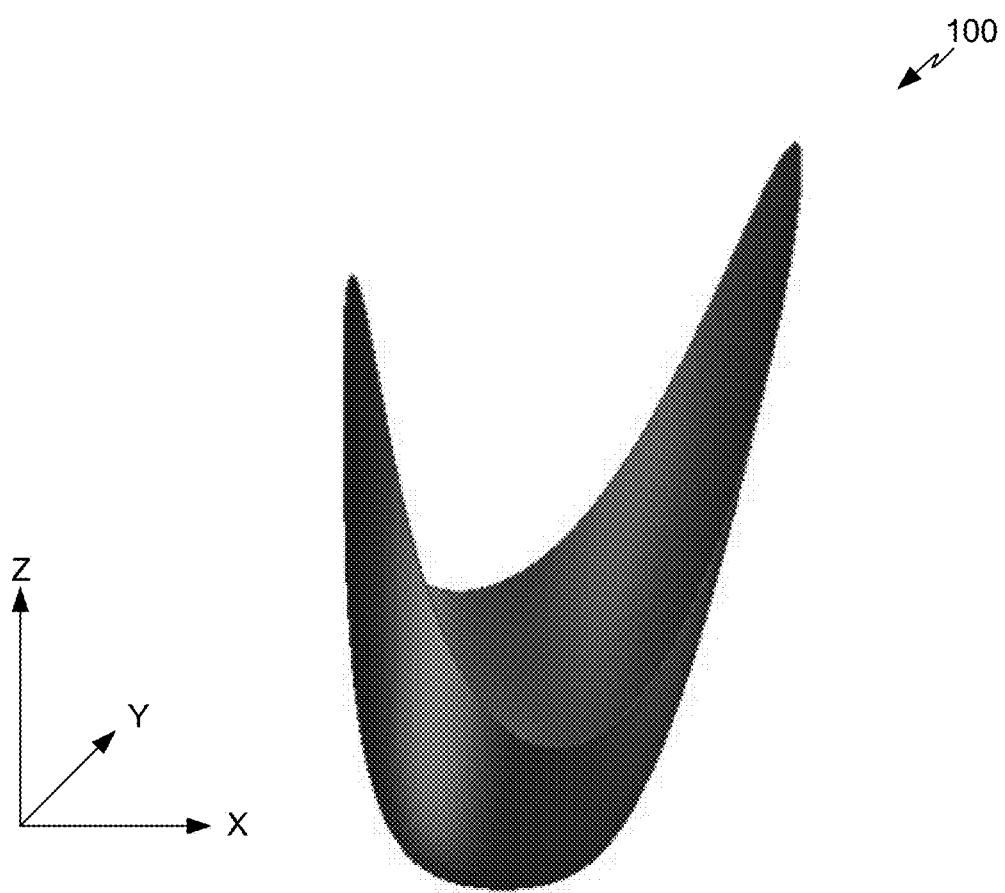
FIG. 14 illustrates a biconic shape corresponding to the shape of a total internal reflection (TIR) lens of the optics device.

As indicated above, the TIR lens 48 of the lens block 12 is an example of a complex optical surface within a lens block for which it is difficult or impossible to accurately determine precise positional and angular alignment within the lens block 12, despite the fact that the TIR lens 48 is visually accessible. The correct location and orientation of the TIR lens 48 within the lens block 12 is not symmetric to the barrel 16 or to the barrel optical axis 28, which is the optical axis of the lens block 12. FIG. 14 illustrates a biconic shape 100 corresponding to the shape of the TIR lens 48 when the TIR surface is extended in all dimensions for better visualization of its asymmetric profile. This shape 100 is asymmetric relative to the X and Y axes of the X, Y, Z Cartesian coordinate system shown in FIG. 14. For this reason, it is difficult to determine whether or not the TIR lens 48 is precisely aligned within the barrel 16 by viewing the lens 48 through the barrel 16 along the barrel optical axis 28, which corresponds to the Z axis shown in FIG. 14.

For these reasons, an alignment feature has been added to the lens block 12 that has a precise spatial relationship to the lens 48 such that precise alignment of the alignment feature relative to the lens block 12, and more specifically, relative to the barrel 16, ensures precise alignment of the lens 48 relative to the barrel 16.

For illustrative purposes, it will be assumed that the lens block 12 is a monolithically-formed plastic part manufactured by a molding process, although other processes may be used to manufacture the lens block 12, as will be described below in more detail. The mold that is used in the molding process is configured to form an alignment feature in the lens block 12 during the molding process. In accordance with an illustrative embodiment, the alignment feature is formed in the mold during the same mold-making process that is used to make the mold that forms the lens block 12. This ensures that there is a very precise spatial relationship between the alignment feature and the TIR lens 48. After the lens block 12 has been manufactured, existing optical tools can be used to determine whether or not the alignment feature is precisely aligned with the barrel 16, and if not, the extent and direction of misalignment. Precise alignment of the alignment feature with the barrel 16 ensures precise alignment of the TIR lens 48 with the barrel 16, even though the TIR lens 48 is asymmetric relative to the barrel optical axis 28. If there is any misalignment between the alignment feature and the barrel 16, the extent of misalignment is used to modify the mold to correct the misalignment, as will be described below in more detail. An illustrative embodiment of the alignment feature and of the molding method will now be described with reference to FIGS. 15-19C.

Figure 15:
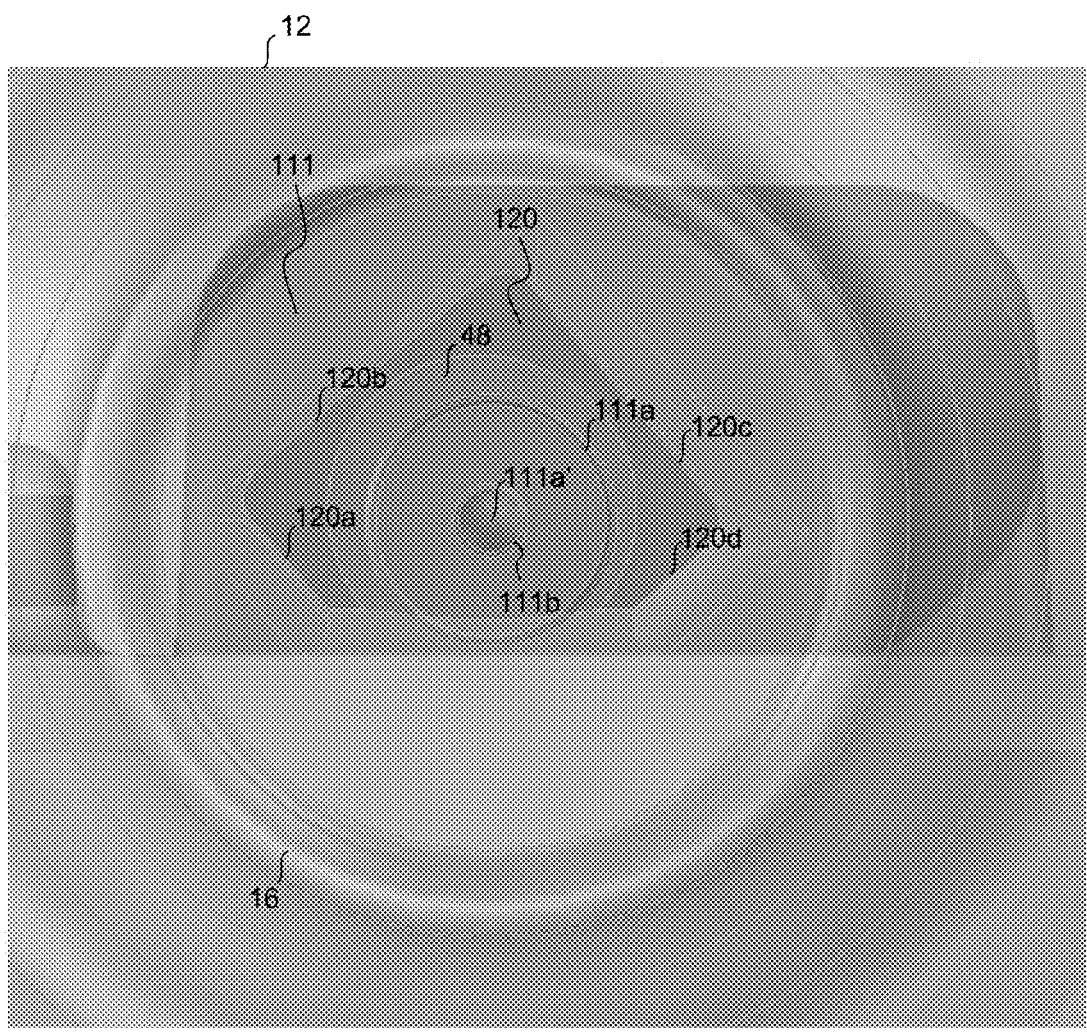
FIG. 15 illustrates a front view of a portion of a semitransparent lens block of the optics device that includes the barrel and that has a square alignment feature disposed behind a concentric feature formed in a back end of the lens block.
Figure 15:
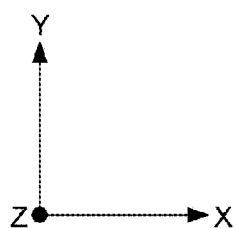

FIG. 15 illustrates a front view of a portion of the semitransparent lens block 12 that includes the barrel 16. At the back end of the barrel 16, a mostly transparent wall 111 exists that is perpendicular to the barrel optical axis 28 (FIG. 1). The wall 111 has a concentric feature 111*a* formed therein that is concentric with the barrel optical axis 28. Behind the concentric feature 111*a* (the +Z direction shown in FIGS. 3 and 4), the TIR lens 48 is disposed. The TIR lens 48 is surrounded by the alignment feature 120, which, in accordance with this illustrative embodiment, is formed in the same continuous, homogeneous region of optically transparent material as that in which the lens 48 is formed. In accordance with this illustrative embodiment, the alignment feature 120 is generally a square feature having sides 120*a* and 120*c* that are parallel to one another and having sides 120*b* and 120*d* that are parallel to one another and perpendicular to sides 120*a* and 120*c*. The square alignment feature 120 has a fifth side 120*e* that is neither parallel nor perpendicular to sides 120*a*-120*d*, for reasons that will be described below in more detail.

Figure 16:
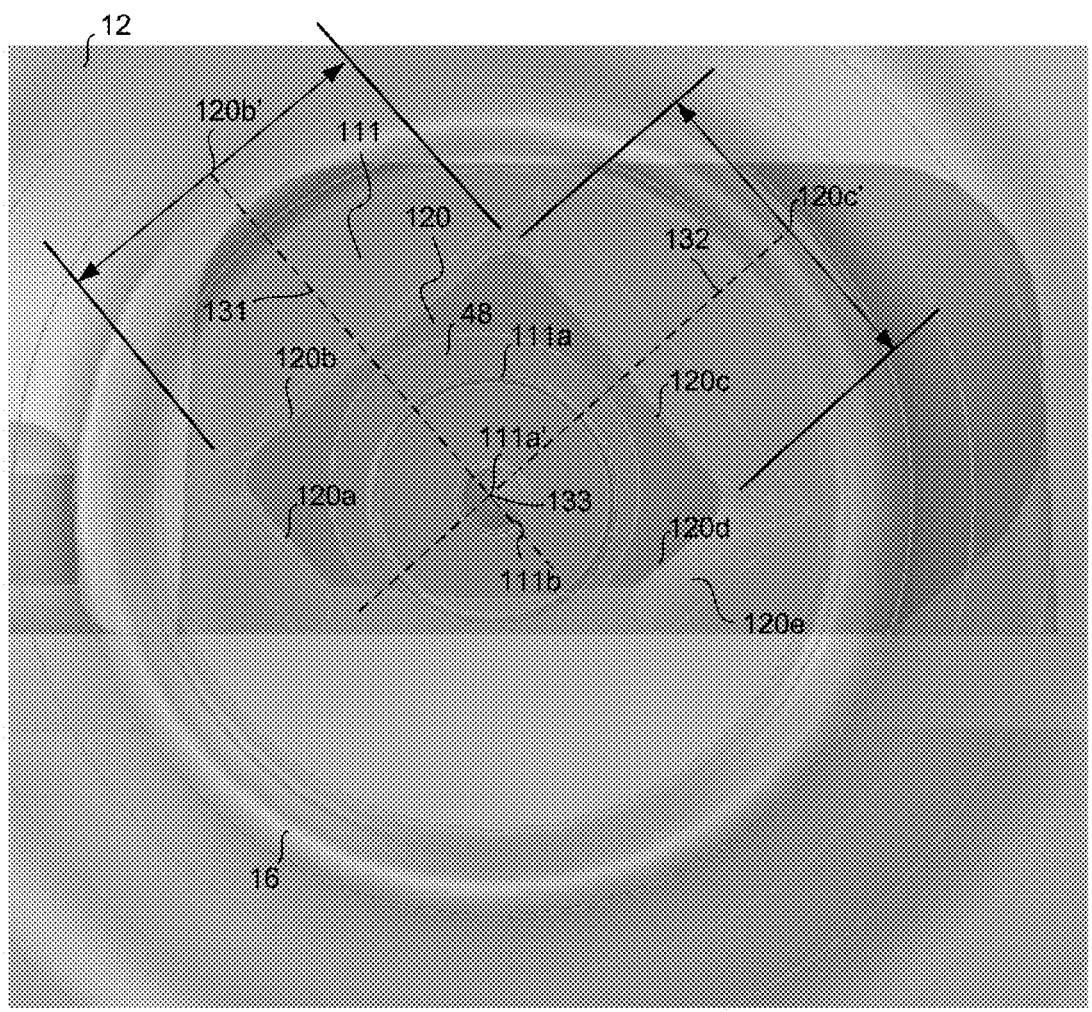
FIG. 16 illustrates a front view of the portion of the semitransparent lens block shown in FIG. 15 overlaid with lines to demonstrate the manner in which two sides of the square alignment feature may be used to locate a center of the square alignment feature.

FIG. 16 illustrates a front view of the portion of the semitransparent lens block 12 shown in FIG. 15 overlaid with lines to demonstrate the manner in which two of the sides 120*b* and 120*c* of the square alignment feature 120 may be used to locate the center of the feature 120. The concentric feature 111*a* has a center 111*a*' that is also the center of the square alignment feature 120 when the square alignment feature 120 is precisely aligned with the concentric feature 111*a*. The center 111*a*' of the concentric feature 111*a* is located on the barrel optical axis 28.

The square alignment feature 120 and the concentric feature 111*a* are readily measurable using various video inspection/measurement tools, such as those offered by Optical Gauging Products, Inc. of Rochester, N.Y. It should be noted that such a video inspection/measurement tool is capable of providing the proper view direction by adjusting the viewing direction to be parallel to the barrel optical axis 28. The video inspection/measurement tool (not shown) performs an edge finding algorithm on captured images of the lens block 12 taken along the barrel optical axis 28 by the tool. The edge finding algorithm locates the sides 120*b* and 120*c* of the feature 120. Because the sides 120*b* and 120*c* are of equal lengths, L1 and L2, respectively, that are known to the tool, once the sides 120*b* and 120*c* have been located, the tool can easily determine the centers 120*b*' and 120*c*' of the sides 120*b* and 120*c*, respectively. The tool then traces lines 131 and 132 perpendicular to the sides 120*b* and 120*c* from the centers 120*b*' and 120*c*' toward the barrel optical axis 28 and finds the location where the lines 131 and 132 intersect one another. This intersection location 133 is the center of the square alignment feature 120.

The manner in which edge finding algorithms are performed is well known in the art of image analysis, and therefore persons of skill in the art will understand the manner in which a suitable video inspection/measurement tool can be programmed or configured to perform such a function. It should also be noted that the process of locating the center 133 of the square alignment feature 120 may be performed manually by a trained person using other instruments, such as a tooling microscope, for example.

The video inspection/measurement tool also performs an algorithm in software that processes captured images of the lens block 12 taken along the barrel optical axis 28 to find the concentric feature 111*a* and to locate the center 111*a*' of the concentric feature 111*a*. One suitable algorithm for performing this function is a pattern matching algorithm that determines a correlation between the captured images and a mask pattern having the same shape and size as the concentric feature 111*a* to locate the concentric feature 111*a*. In accordance with this illustrative embodiment, the mask pattern is a circle having the same, or approximately the same, diameter as the concentric feature 111*a*.

For an image frame captured by the tool, the software overlays the mask pattern on the captured image and subtracts the real pixel values from the mask pixel values. For anything other than a perfect match, there will be some difference between the real pixel value and the mask pixel value. The difference values are then squared and summed to obtain a correlation value. The mask pattern is then shifted relative to the captured image by one pixel and the calculations are performed again to obtain the next correlation value. This process is performed for all of the pixels in the captured image and then a determination is made as to which of the correlation values is the minimum value. The minimum correlation value, which ideally is zero, corresponds to a perfect match between the mask pattern and the concentric feature 111*a*. Once the concentric feature 111*a* has been located in this manner, the center 111*a*' of the concentric feature 111*a* is easily located as the mid-point of the known diameter of the concentric feature 111*a*.

Once the centers 111*a*' and 133 of the concentric feature 111*a* and of the square alignment feature 120, respectively, have been found, the positions of the centers 111*a*' and 133 relative to one another are used by the tool to determine the extent and direction of misalignment, if any, between the square alignment feature 120 and the concentric feature 111*a*. The misalignment between the square alignment feature 120 and the concentric feature 111*a* is equal to the misalignment between the barrel optical axis 28 and the TIR lens 48. The mold is then modified to correct, or remove, the alignment error. As will be described below in more detail, in accordance with this illustrative embodiment the mold is adjusted by repositioning the portion of the mold that is used to form the barrel 16 to prevent misalignment in subsequently manufactured lens blocks 12.

The process of locating the concentric feature 111*a* may also be performed manually by using a microscope and a reticle having the same shape and size as the concentric feature 111*a*, i.e., a circular reticle in accordance with this illustrative embodiment have the same diameter as the concentric feature 111*a*. A person performing the inspection would view the lens block 12 along the barrel optical axis 28 while moving the reticle around in the field of view until the reticle is concentric with the concentric feature 111*a*. Once the concentric feature 111*a* has been found, the center of the reticle corresponds to the center 111*a*' of the concentric feature 111*a*. The center 133 of the square alignment feature 120 can be found in a similar manner using a square reticle having the same size as the square alignment feature 120 and aligning two sides of the reticle with the sides 120*b* and 120*c* of the square alignment feature 120. Any misalignment between the center 111*a*' of the concentric feature 111*a* and the center 133 of the square alignment feature 120 can then be determined visually. The mold is then adjusted by repositioning the portion of the mold that is used to form the barrel 16 to prevent misalignment in subsequently manufactured lens blocks 12.

When the square alignment feature 120 is in its properly aligned position, it lies in a plane that is not parallel to the plane in which the wall 111 lies. In other words, while the barrel optical axis 28 is normal to the wall 111, it is not normal to the plane in which the square alignment feature 120 lies. The plane in which the square alignment feature 120 lies is at a particular oblique angle, $\alpha$, to the X-Y plane. The plane in which the square alignment feature 120 lies is at a particular angle, $\beta$, to the Y-Z plane. In accordance with this illustrative embodiment, the angle $\beta$ is 90°, i.e., the plane in which the square alignment feature 120 lies is perpendicular to the Y-Z plane. The angle $\beta$ could be an angle other than 90°. To ensure that the square alignment feature 120 is at the proper angles $\alpha$ and $\beta$, a flat surface 120*e* may be included on the square alignment feature 120 that is parallel to the wall 111 when the square alignment feature 120 is at the proper angles $\alpha$ and $\beta$. The tool or a person performing a visual inspection can easily determine whether the fifth side 120*e* and the wall 111 are parallel to one another. For example, a person can use a tool such as an interferometer to determine the magnitude and direction of any angular correction that needs to be made to the molding process.

Thus, as will be understood by persons of skill in the art in view of the description being provided herein, the invention makes it possible to separately measure and correct the positional and angular orientation of the alignment feature 120, thereby correcting the positional and angular orientation of the TIR lens 48. Stated another way, the invention decouples the measurement and correction of the positional and angular orientations from one another and makes it possible to separately measure and correct them. Without the invention, it would not be possible to directly measure the complex lens profile because the angular and positional errors of that surface are not separable, which leads to difficulties in applying the proper correction. The invention makes it possible to separately measure and correct positional alignment of the lens 48 in the X, Y and Z dimensions and angular alignment of the lens 48 in $\alpha$ and $\beta$ indirectly by using the alignment feature is 120.

Figure 17:
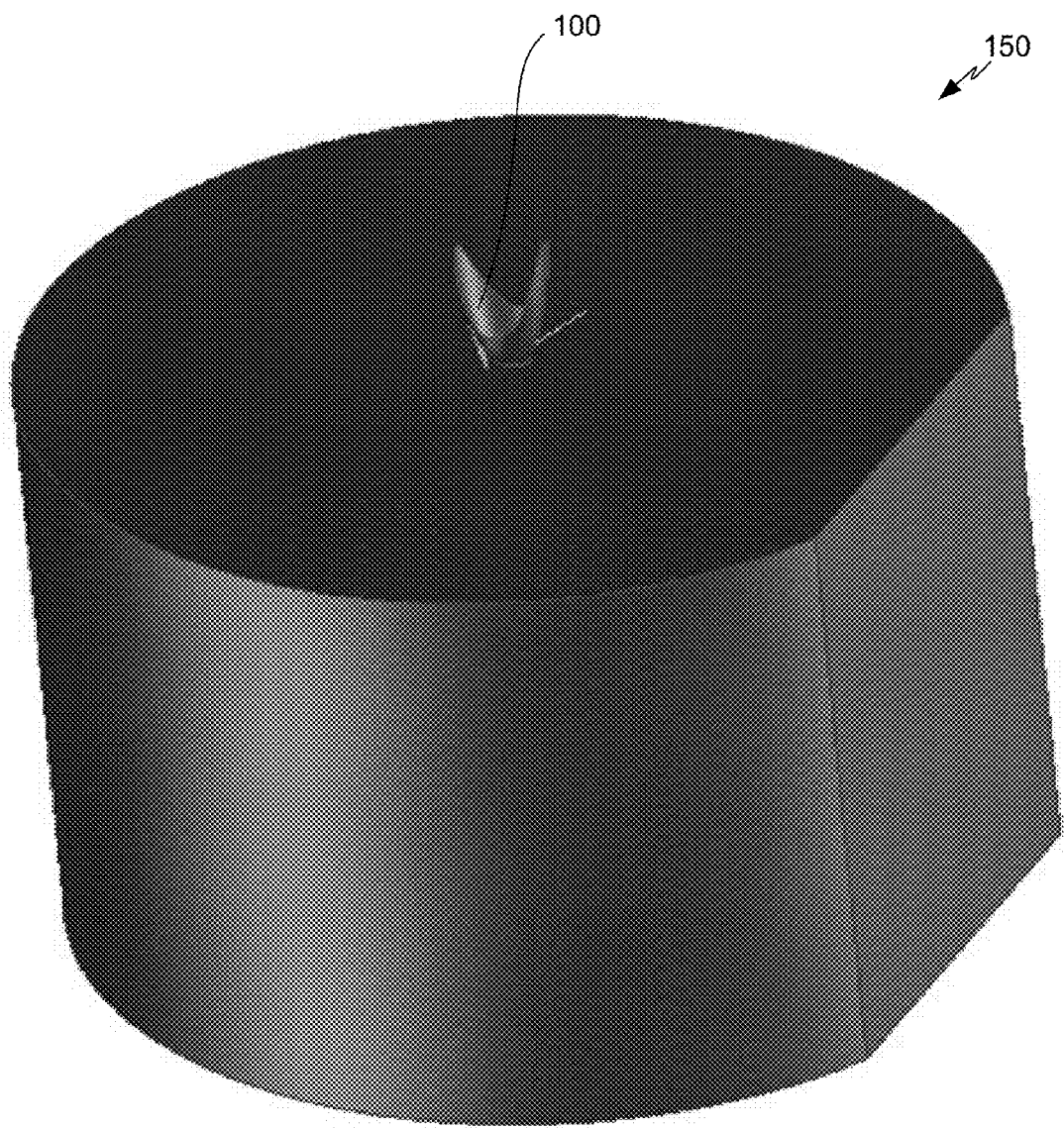
FIG. 17 illustrates a perspective view of a steel diamond-turned puck that is used to form a mold pin that is used in a mold during a molding process to form the lens block of the optics device.

FIG. 17 illustrates a perspective view of a steel puck 150 that has been diamond turned to form the optic in what will be the optical mold pin (not shown) that is used in a mold during a molding process to form the lens block 12. The puck 150 is shown with the portion of the biconic shape 100 shown in FIG. 14 superimposed thereon to demonstrate that only a very small portion of the biconic shape 100 is needed to form the TIR lens 48. Although not shown in FIG. 14, the shape of the square alignment feature 120 is also formed in the puck 150.

Diamond lathes exist that enable these shapes to be formed simultaneously in the puck 150. For example, Moore Nanotechnology Systems, LLC of Swanzey, N.H. offers diamond lathes that are capable of precisely forming the portion of the biconic shape 100 that forms the TIR lens 48 and the square alignment feature 120 in the puck 150 such that these shapes have a precise spatial relationship to one another with nanometer precision.

Figure 18:
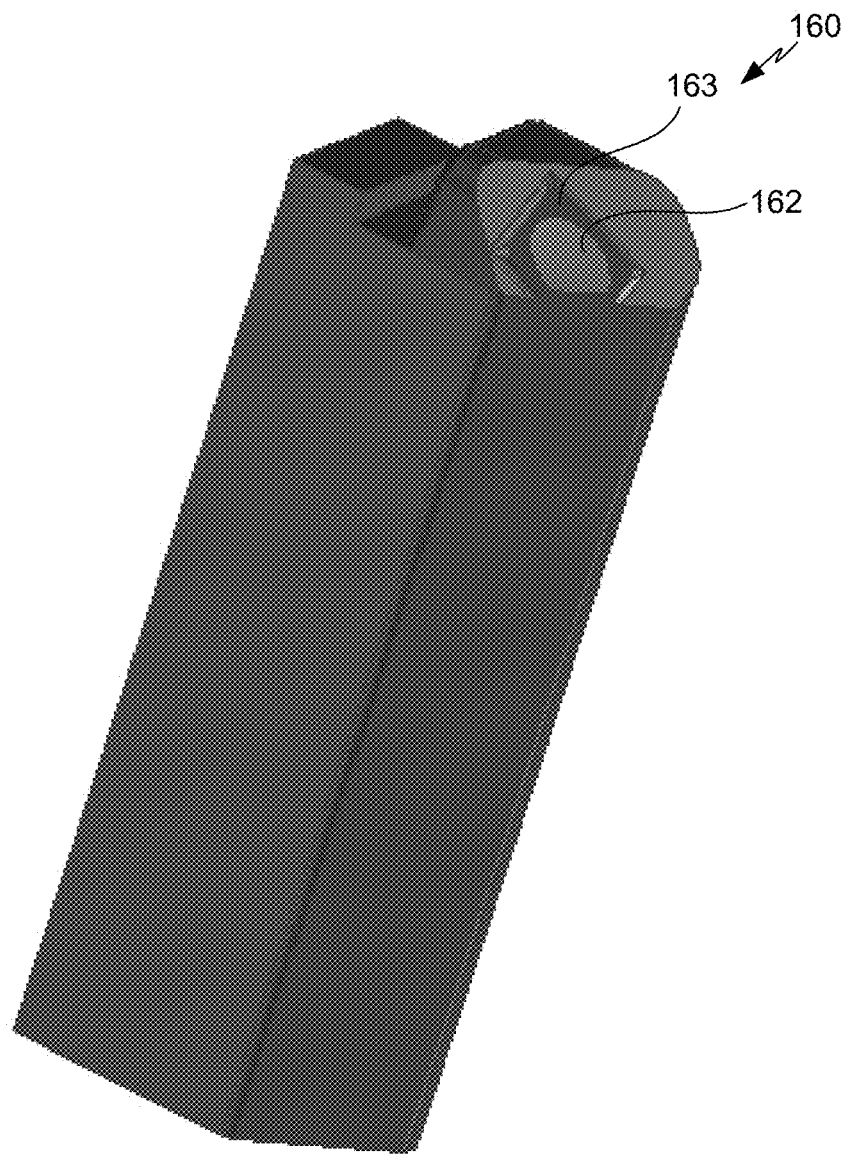
FIG. 18 illustrates a perspective view of a mold pin that has been cut from the diamond-turned puck shown in FIG. 17.

FIG. 18 illustrates a perspective view of a mold pin 160 that has been cut from the diamond-turned puck 150 shown in FIG. 17 by wire-cut electrical discharge machining (wire EDM). The mold pin 160 has the shapes 162 and 163 of the TIR lens 48 and of the square alignment feature 120, respectively, formed therein. The mold pin 160 is used as an insert to the mold that will be used to mold the lens block 12, as will now be described with reference to FIGS. 19A-19C.

Figure 19A:
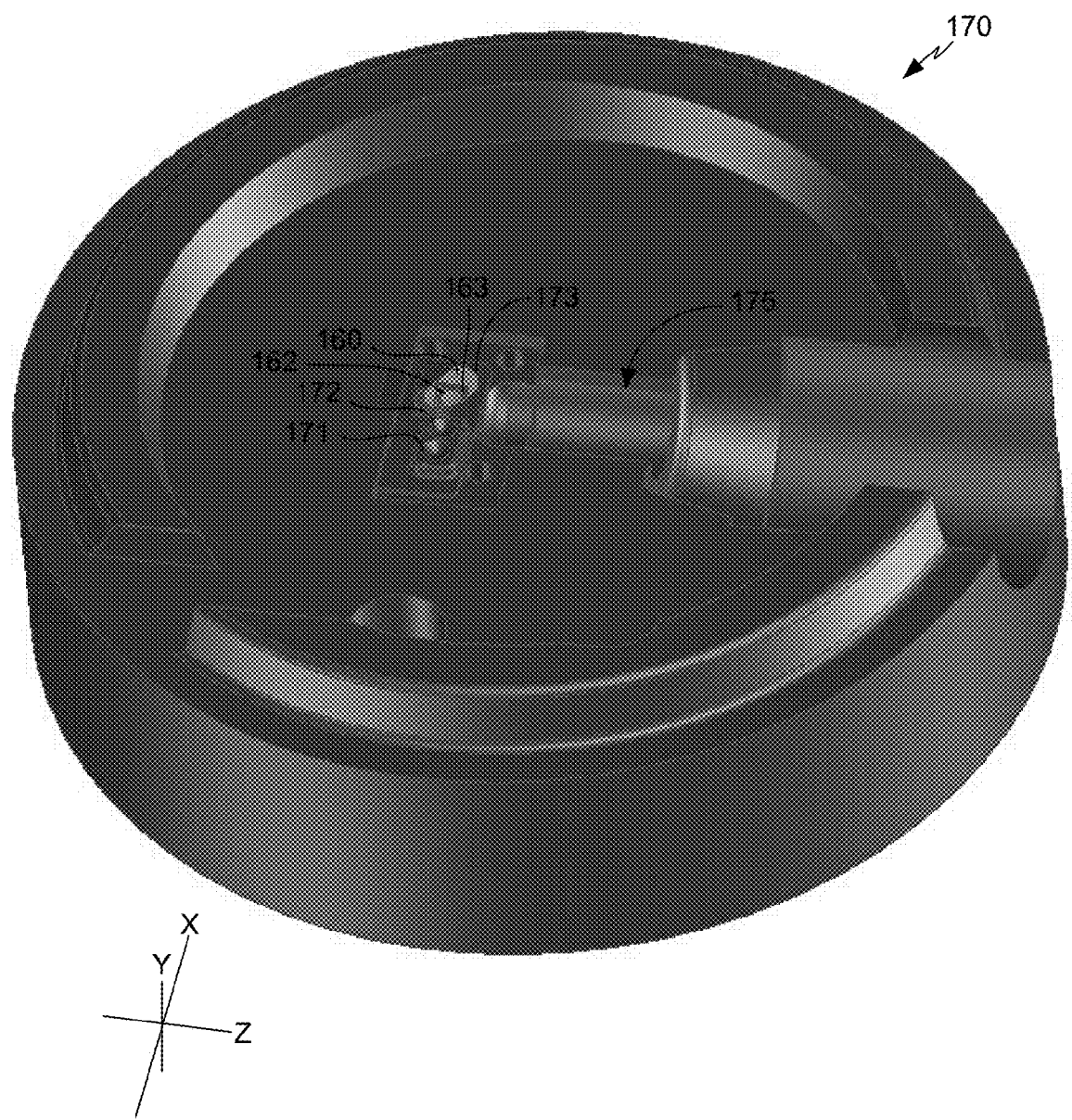
FIG. 19A illustrates a top perspective view of a mold cavity of a plastic molding tool that may be used to make the optics device.

FIG. 19A illustrates a top perspective view of a mold cavity 170 of a plastic molding tool (not shown). The mold cavity 170 corresponds to the "A" side, or the "hot" side, of the mold. The "B" side, or the "ejector" side of the mold is not shown for ease of illustration. The cavity 170 has mold shapes 171 and 172 directly formed therein for molding the lenses 50 and 52, respectively. These shapes 171 and 172 are typically formed by a diamond machining process (e.g., diamond turning or diamond milling, such as on the aforementioned Moore Nanotechnology diamond lathe). Diamond machining processes that are suitable for this purpose are known in the art. Diamond machining can be performed with very high precision. The mold pin 160 is inserted into a precisely shaped and sized opening 173 formed in the cavity 170. The opening 173 is complementary in shape and size to the shape and size of the mold pin 160. The cavity 170 has a barrel insert receptacle 175 formed therein for receiving a barrel insert that will be used to mold the barrel 16. The barrel insert receptacle 175 can also be formed by a diamond machining process.

Figure 19B:
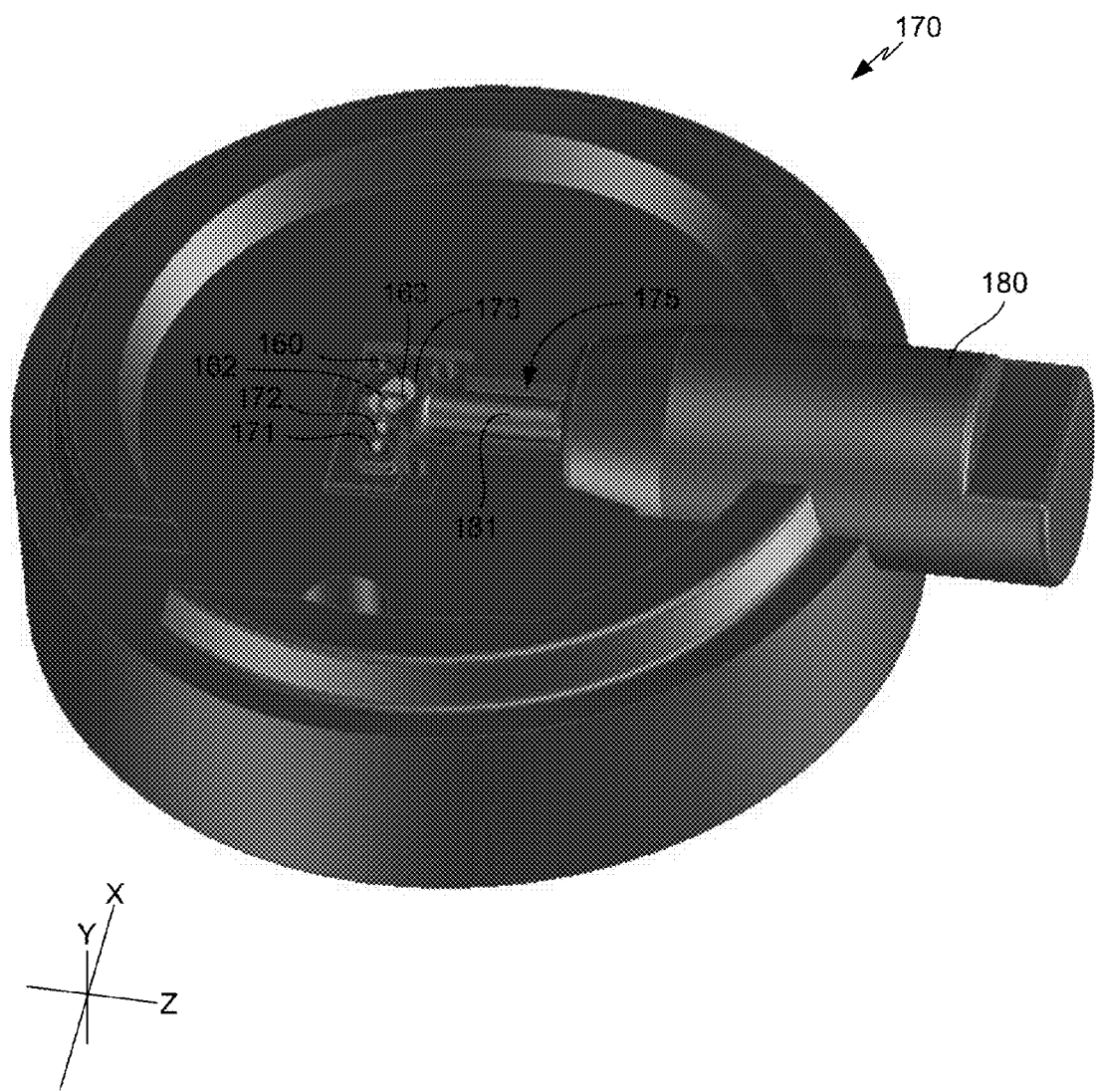
FIG. 19B illustrates a top perspective view of the mold cavity shown in FIG. 19A having a barrel insert disposed in a barrel insert receptacle of the mold cavity.
Figure 19C:
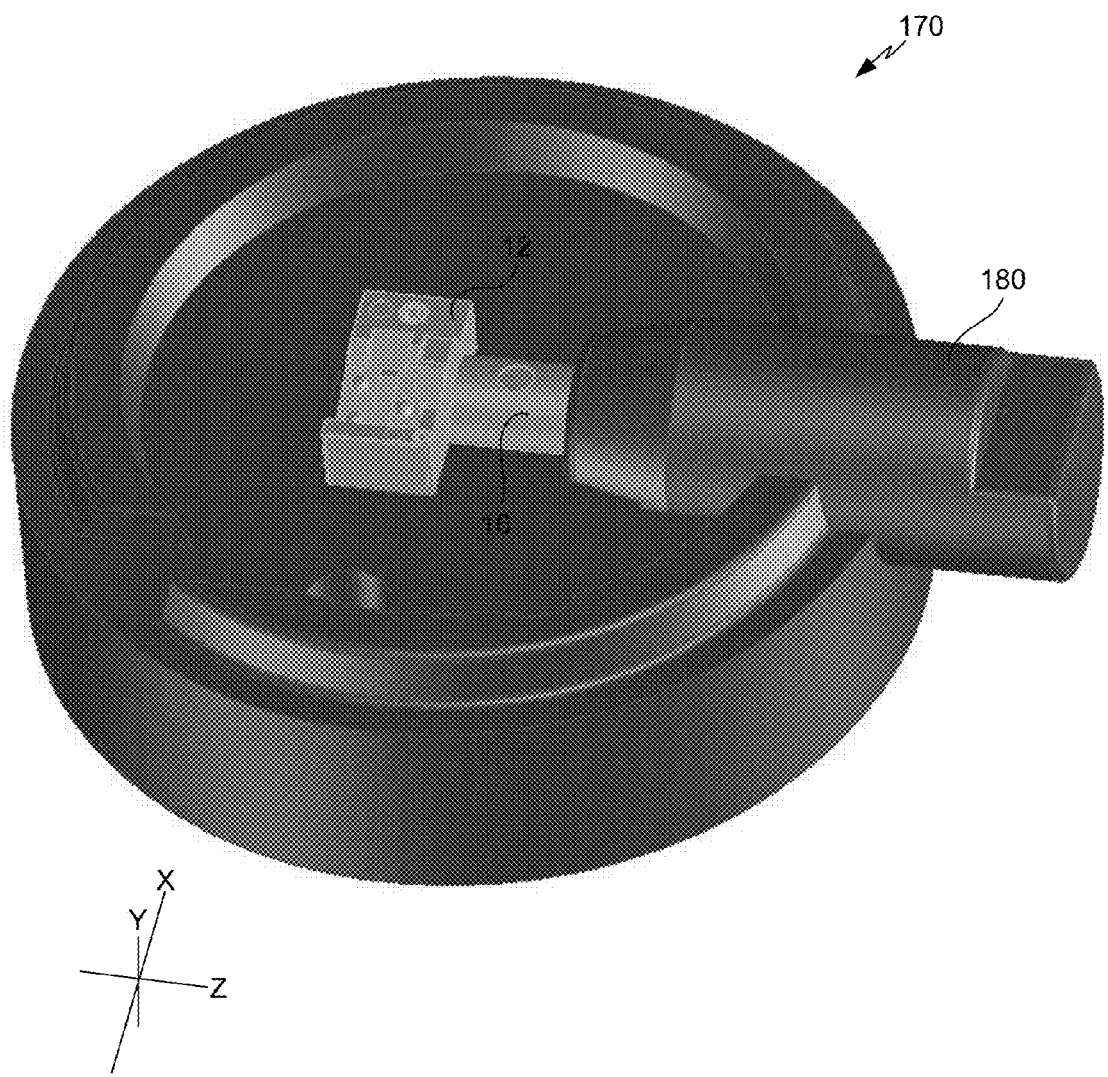
FIG. 19C illustrates a top perspective view of the mold cavity shown in FIG. 19A having the barrel insert disposed in the barrel insert receptacle and having the lens block of the optics device disposed thereon.

FIG. 19B illustrates a top perspective view of the cavity 170 shown in FIG. 19A having a barrel insert 180 disposed in the barrel insert receptacle 175. FIG. 19C illustrates a top perspective view of the cavity 170 shown in FIG. 19A having the barrel insert 180 disposed in the barrel insert receptacle 175 and having the molded plastic lens block 12 disposed thereon. Via the molding process, the inner surface of the barrel 16 becomes complementary in shape and size to the outer surface of the barrel-shaped end 181 of the barrel insert 180. The positioning of the barrel insert 180 within the barrel insert receptacle 175 sets the position of the barrel optical axis 28 relative to the TIR lens shape 162. Once the barrel insert 180 has been properly positioned, it is locked in position inside of the mold tool and the mold tool (not shown) uses the mold cavity 170 in combination with the injector side (not shown) of the mold (not shown) to produce the lens block 12 shown in FIG. 19C.

As indicated above, after the lens block 12 has been molded, a determination is made as to whether concentric feature 111a is precisely aligned with the square alignment feature 120, and if not, the extent of any misalignment is determined. If there is any misalignment, the position of the barrel insert 180 within the barrel insert receptacle 175 is adjusted to correct the alignment error so that the concentric feature 111a is precisely aligned with the square alignment feature 120 in subsequently molded lens blocks 12. Such an adjustment might be achieved by making special versions of the barrel insert 180 that have the barrel feature eccentric to the locating taper to move the barrel 16, and concentric feature 111a, into alignment with the lens 48. The measurements of error would be used to specify the eccentric amount and direction of the new barrel insert 180.

Figure 20:
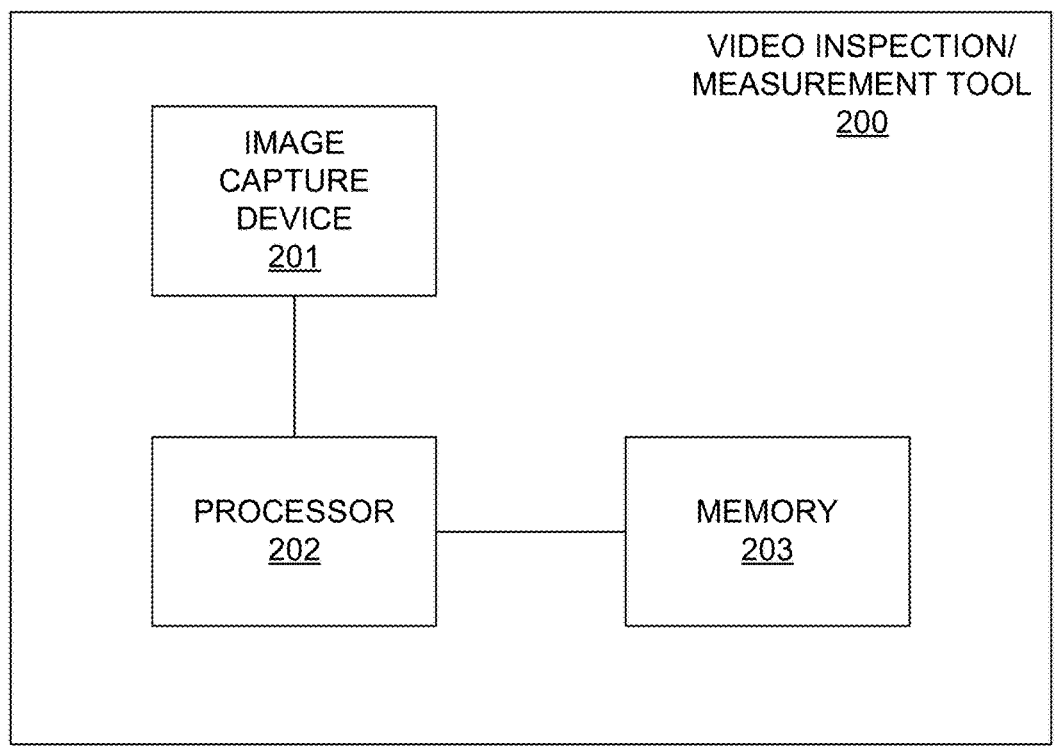
FIG. 20 illustrates a block diagram of a video inspection/measurement tool for determining whether an optical surface of the lens block of the optics device is aligned with the optical axis of the lens block.

FIG. 20 illustrates a block diagram of a video inspection/measurement tool 200 of the type described above for determining whether the TIR lens 48 is aligned with the barrel optical axis 28. An image capture device 201 of the tool 200, which may be a video camera, for example, is aligned with the barrel optical axis 28 and captures one or more images of the alignment feature 120. A processor 202 of the tool 200 processes the captured image or images in the manner described above with reference to FIG. 16 and determines whether the alignment feature 120 is aligned with the barrel optical axis 28, thereby determining whether the TIR lens 48 is aligned with the barrel optical axis 28.

The processor 202 may be any type of processor including, for example, a microprocessor, a microcontroller, a field programmable gate array (FPGA), an application specific integrated circuit (ASIC), a digital signal processor (DSP), a system on a chip (SOC), or any other type of processing device capable of being programmed or configured to perform the processing tasks described above. The tool 200 typically includes a memory device 203, which is typically a solid state memory device, for storing computer code for execution by the processor 202. The memory device 203 may also store data captured by the image capture device 201 and processed data produced by the processor 202.

It should be noted that lens block 12 may be a device made by direct machining rather than molding. A variety of direct machining processes exist that are suitable making the lens block 12 with the precision needed to ensure that alignment of the alignment feature 120 with the concentric feature 111a results in alignment of the TIR lens 48 with the barrel optical axis 28. Also, while the lens block 12 is typically made of plastic, it may be made of other materials including glass, various ceramic materials and various metallic materials.

The alignment feature 120 could be formed in a secondary diamond turning process after a primary diamond turning process has been performed to form the biconic shape 100 (FIG. 17) in the steel puck 150. However, forming the alignment feature 120 during a secondary process may result in reduced precision in the spatial relationship between the alignment feature 120 and the TIR lens 48, but the reduced precision may be sufficient for some applications. Another direct machining process known as computer numeral control (CNC) grinding may also be used for this purpose. The invention is not limited with respect to the process that is used for this purpose, as will be understood by persons of skill in the art in view of the description being provided herein.

It should be noted that while the illustrative embodiments have been described with reference to using the square alignment feature 120 to determine alignment of a complex optical element of a lens block relative to the lens block, in cases in which the optical element is rotationally symmetric, a round alignment feature instead of a square alignment feature may be used for this purpose. Also, while the term "square" has been used to describe the shape of the alignment feature 120, only two sides 120b and 120c of the square are needed to determine alignment of the feature 120 with the concentric feature 111a. Therefore, the term "square," as that term is used herein, is intended to denote a feature having at least two sides that are perpendicular to one another, that are of known length and that have ends that meet. It will be understood by those of skill in the art, in view of the description provided herein, that other shapes may be used for this purpose.

It should be noted that the invention has been described with reference to a few illustrative embodiments for the purposes of demonstrating the principles and concepts of the invention. Persons of skill in the art will understand that many modifications may be made to the embodiments described herein that are within the scope of the invention. For example, while the illustrative embodiments have been described with reference to a lens block 12 having a particular configuration, the invention can be used with any type of lens block having any configuration. Also, while the invention has been described with reference to a biconic lens, the principles and concepts of the invention can be applied to all types of complex lenses. Also, while the principles and concepts are particularly useful for determining alignment of complex lenses, they can also be used to determine alignment of rotationally symmetric lenses, i.e., non-complex shapes, although alignment of rotationally symmetric lenses can usually be determined directly and therefore a separate alignment feature is normally not needed. It should also be noted that while the invention has been described with reference to altering the molding process to correct for any misalignment, principles and concepts of the invention apply to lens blocks manufactured via other types of manufacturing processes, as will be understood by those of skill in the art.

What is claimed is:

1. An optics device for use in an optical communications module for coupling light between an end of at least one optical fiber and an optoelectronic device of the module, the optics device comprising:
a lens block, the lens block having a body, the body having at least a first optical surface formed therein and at least a first alignment feature formed therein, the first alignment feature having a known spatial relationship with the first optical surface such that positional and angular alignment of the first alignment feature relative to an optical axis of the lens block guarantees positional and angular alignment of the first optical surface relative to the optical axis of the lens block.

2. The optics device of claim 1, wherein the lens block has a barrel having a first end that is adapted to mate with an end of a first optical fiber cable or with an optical connector disposed on the end of the optical fiber cable, the barrel having a second end that is joined with the body of the lens block, and wherein the optical axis of the lens block corresponds to an optical axis of the barrel such that alignment of the first alignment feature with the barrel optical axis guarantees alignment of the first optical surface with the barrel optical axis.

3. The optics device of claim 2, wherein the first optical surface is rotationally symmetric relative to the barrel optical axis, and wherein the first alignment feature surrounds the first optical surface and has a round shape.

4. The optics device of claim 2, wherein the first optical surface is a first lens that is rotationally asymmetric relative to the barrel optical axis.

5. The optics device of claim 4, wherein the first lens is a biconic lens.

6. The optics device of claim 4, wherein the first alignment feature surrounds the first lens and has a non-round shape.

7. The optics device of claim 6, wherein the first alignment feature has at least first and second sides that have a known spatial relationship with each other.

8. The optics device of claim 7, wherein the first and second sides are perpendicular to one another, have known lengths and have ends that meet.

9. The optics device of claim 8, wherein the first alignment feature has at least third and fourth sides that are perpendicular to one another and parallel to the first and second sides, respectively.

10. The optics device of claim 8, wherein the first and second sides of the first alignment feature have equal lengths.

11. The optics device of claim 2, wherein the body of the lens block has a concentric feature formed therein proximate the second end of the barrel that is concentric with the barrel such that the barrel optical axis passes through a center of the concentric feature, and wherein alignment of a center of the first alignment feature with the center of the concentric feature guarantees alignment of the first optical surface with the barrel optical axis.

12. The optics device of claim 1, wherein at least the first optical surface and the first alignment feature are direct-machined features.

13. The optics device of claim 1, wherein the optics device is a plastic molded part formed by a molding process.

14. An optics device for use in an optical communications module for coupling light between an end of at least one optical fiber and an optoelectronic device of the module, the optics device comprising:
a lens block, the lens block having a body, the body having at least a first complex lens formed therein and at least a first alignment feature formed therein, the first alignment feature having a known spatial relationship with the first complex lens such that positional and angular alignment of the first alignment feature relative to an optical axis of the lens block guarantees positional and angular alignment of the first complex lens relative to the optical axis of the lens block, wherein the first complex lens is rotationally asymmetric relative to the optical axis of the lens block.

15. The optics device of claim 14, wherein the lens block has a barrel having a first end that is adapted to mate with an end of a first optical fiber cable or with an optical connector disposed on the end of the optical fiber cable, the barrel having a second end that is joined with the body of the lens block, and wherein the optical axis of the lens block corresponds to an optical axis of the barrel such that alignment of the first alignment feature with the barrel optical axis guarantees alignment of the first complex lens with the barrel optical axis.

16. The optics device of claim 14, wherein the first complex lens is a total internal reflection (TIR) lens.

17. The optics device of claim 14, wherein the first alignment feature surrounds the first complex lens and has a non-round shape.

18. The optics device of claim 17, wherein the first alignment feature has first and second sides that are perpendicular to one another, have known lengths and have ends that meet.

19. The optics device of claim 18, wherein the first and second sides of the first alignment feature have equal lengths.

20. A method of determining whether a first lens of a lens block of an optics device is aligned with an optical axis of the lens block, the method comprising:

aligning an image capturing device with the optical axis of a lens block, the lens block having a body, the body having at least a first optical surface formed therein and at least a first alignment feature formed therein, the first alignment feature having a known spatial relationship with the first optical surface and with the optical axis of the lens block such that positional and angular alignment of the first alignment feature relative to the optical axis of the lens block results in positional and angular alignment of the first optical surface relative to the optical axis of the lens block;

capturing one or more images of the first alignment feature with the image capturing device; and processing the captured image or images in a processor to determine whether the first alignment feature is positionally and angularly aligned relative to the optical axis of the lens block, thereby determining whether the first optical surface is positionally and angularly aligned relative to the optical axis of the lens block.

21. The method of claim 20, wherein the lens block has a barrel having a first end that is adapted to mate with an end of a first optical fiber cable or with an optical connector disposed on the end of the optical fiber cable, the barrel having a second end that is joined with the body of the lens block, and wherein the optical axis of the lens block corresponds to an optical axis of the barrel, and wherein the processing step determines whether the first alignment feature is aligned with the optical axis of the lens block by determining whether the first alignment feature is aligned with the barrel optical axis.

22. The method of claim 21, wherein the body of the lens block has a concentric feature formed therein proximate the second end of the barrel that is concentric with the barrel such that the barrel optical axis passes through a center of the concentric feature, and wherein the processing step determines whether the first alignment feature is aligned with the barrel optical axis by determining whether a center of the first alignment feature is aligned with the center of the concentric feature.

* * * * *